United States Patent
Connell et al.

(10) Patent No.: US 10,813,263 B2
(45) Date of Patent: *Oct. 27, 2020

(54) AUTONOMOUS OR REMOTE-CONTROLLED VEHICLE PLATFORM FOR SPRAYING

(71) Applicant: Deere & Company, Moline, IL (US)

(72) Inventors: Richard Connell, Slater, IA (US); Shayne C. Rich, Grimes, IA (US); Brandon M. McDonald, Johnston, IA (US); Newton L. Lingenfelter, Clarion, IA (US); Michael M. Miller, Mason City, IA (US); Austin N. Thompson, Hardy, IA (US)

(73) Assignee: Deere & Company, Moline, IL (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/241,622

(22) Filed: Jan. 7, 2019

(65) Prior Publication Data
US 2019/0133022 A1     May 9, 2019

Related U.S. Application Data

(63) Continuation of application No. 15/708,703, filed on Sep. 19, 2017, now Pat. No. 10,172,274.
(Continued)

(51) Int. Cl.
*A01B 63/00* (2006.01)
*B62D 55/30* (2006.01)
(Continued)

(52) U.S. Cl.
CPC ............ *A01B 63/008* (2013.01); *A01B 49/06* (2013.01); *A01B 51/026* (2013.01);
(Continued)

(58) Field of Classification Search
CPC ..... A01B 63/008; A01B 69/008; A01B 49/06; A01B 51/026; A01B 79/005;
(Continued)

(56) References Cited

U.S. PATENT DOCUMENTS

| | | |
|---|---|---|
| 4,325,443 A | 4/1982 | Fischer |
| 4,500,139 A | 2/1985 | Tucek |

(Continued)

FOREIGN PATENT DOCUMENTS

| | | |
|---|---|---|
| DE | 102012214386 | 2/2014 |
| DE | 10 2016 107979 A1 | 11/2016 |

(Continued)

OTHER PUBLICATIONS

European Search Report for corresponding application No. EP 18173833.7 dated Mar. 14, 2019.
(Continued)

*Primary Examiner* — Steven J Ganey
(74) *Attorney, Agent, or Firm* — Brinks Gilson & Lione

(57) ABSTRACT

A vehicle platform comprises a central body that can support one or more implement configurations, such as sprayer booms, or planting row units. A plurality of adjustable legs extends downward from the central body. An arm assembly has a first end and a second end opposite the first end. The first end is pivotably coupled the central body and the second end coupled to a support beam. A plurality of nozzle assemblies is supported from the support beam. An arm actuator is arranged to control a transverse position of the support beam and the nozzle assemblies with respect to a reference point on the central body, such that each nozzle assembly may be aligned with a row of seeds or plants.

28 Claims, 14 Drawing Sheets

Related U.S. Application Data

(60) Provisional application No. 62/511,549, filed on May 26, 2017.

(51) Int. Cl.

| | | |
|---|---|---|
| *B62D 55/084* | (2006.01) | |
| *B62D 55/065* | (2006.01) | |
| *A01C 23/04* | (2006.01) | |
| *A01C 23/00* | (2006.01) | |
| *A01M 7/00* | (2006.01) | |
| *A01B 79/00* | (2006.01) | |
| *A01B 49/06* | (2006.01) | |
| *A01B 51/02* | (2006.01) | |
| *A01B 63/111* | (2006.01) | |
| *A01C 7/20* | (2006.01) | |
| *B62D 55/12* | (2006.01) | |
| *G05D 1/00* | (2006.01) | |
| *A01B 69/04* | (2006.01) | |
| *A01C 7/10* | (2006.01) | |
| *A01C 5/06* | (2006.01) | |
| *A01B 63/04* | (2006.01) | |
| *A01B 63/12* | (2006.01) | |

(52) U.S. Cl.
CPC .......... *A01B 63/111* (2013.01); *A01B 79/005* (2013.01); *A01C 23/007* (2013.01); *A01C 23/047* (2013.01); *A01M 7/0053* (2013.01); *A01M 7/0057* (2013.01); *A01M 7/0071* (2013.01); *A01M 7/0082* (2013.01); *B62D 55/065* (2013.01); *B62D 55/084* (2013.01); *B62D 55/305* (2013.01); *A01B 63/04* (2013.01); *A01B 63/12* (2013.01); *A01B 69/008* (2013.01); *A01C 5/064* (2013.01); *A01C 5/068* (2013.01); *A01C 7/102* (2013.01); *A01C 7/203* (2013.01); *A01C 7/206* (2013.01); *A01C 7/208* (2013.01); *A01C 23/008* (2013.01); *B62D 55/12* (2013.01); *G05D 1/0011* (2013.01); *G05D 1/0088* (2013.01); *G05D 2201/0201* (2013.01)

(58) Field of Classification Search
CPC ... A01B 63/111; A01C 23/007; A01C 23/047; B62D 55/065; B62D 55/084; B62D 55/305; A01M 7/0053; A01M 7/0071; A01M 7/0057; A01M 7/0082

USPC ................ 239/159, 160, 166, 167, 722, 723
See application file for complete search history.

(56) References Cited

U.S. PATENT DOCUMENTS

| | | |
|---|---|---|
| 4,660,775 A | 4/1987 | Ostrom et al. |
| 5,273,126 A | 12/1993 | Reed et al. |
| 5,452,949 A | 9/1995 | Kelderman |
| 5,628,262 A | 5/1997 | Nelson |
| 6,062,662 A | 5/2000 | Witt |
| 6,805,311 B2 | 10/2004 | Buller |
| 8,453,947 B2 | 6/2013 | Martin et al. |
| 9,265,187 B2 * | 2/2016 | Cavender-Bares ......................... G05D 1/0088 |
| 9,615,497 B2 | 4/2017 | Bassett et al. |
| 10,172,274 B2 * | 1/2019 | Connell .............. A01M 7/0057 |
| 2007/0188605 A1 | 8/2007 | Anderson et al. |
| 2007/0240917 A1 | 10/2007 | Duceppe |
| 2008/0046130 A1 | 2/2008 | Faivre et al. |
| 2008/0211299 A1 | 9/2008 | Witt |
| 2012/0169113 A1 | 7/2012 | La Spina |
| 2013/0154345 A1 | 6/2013 | Schulz et al. |
| 2013/0325242 A1 | 12/2013 | Cavender-Bares et al. |
| 2014/0035355 A1 | 2/2014 | He et al. |
| 2015/0066315 A1 | 3/2015 | Achen et al. |
| 2015/0237791 A1 | 8/2015 | Bassett et al. |
| 2015/0334920 A1 | 11/2015 | Schleicher et al. |
| 2015/0351309 A1 | 12/2015 | Gaus |
| 2016/0338258 A1 | 11/2016 | Wood |
| 2017/0197677 A1 | 7/2017 | Dandurand et al. |
| 2017/0280640 A1 | 10/2017 | Hansen |
| 2018/0338413 A1 | 11/2018 | Connell et al. |

FOREIGN PATENT DOCUMENTS

| | | |
|---|---|---|
| EP | 0 140 318 A1 | 5/1985 |
| EP | 0 238 465 A1 | 9/1987 |
| EP | 2 574 526 A2 | 4/2013 |
| EP | 3 366 133 A1 | 8/2018 |
| FR | 2 696 614 A1 | 4/1994 |
| WO | WO 2015/191556 A2 | 12/2015 |

OTHER PUBLICATIONS

European Search Report for corresponding application No. EP 18173833.7 dated Oct. 15, 2018.

Extended European Search Report for corresponding application No. 18173832.9 dated Jul. 10, 2019 (17 pages).

* cited by examiner

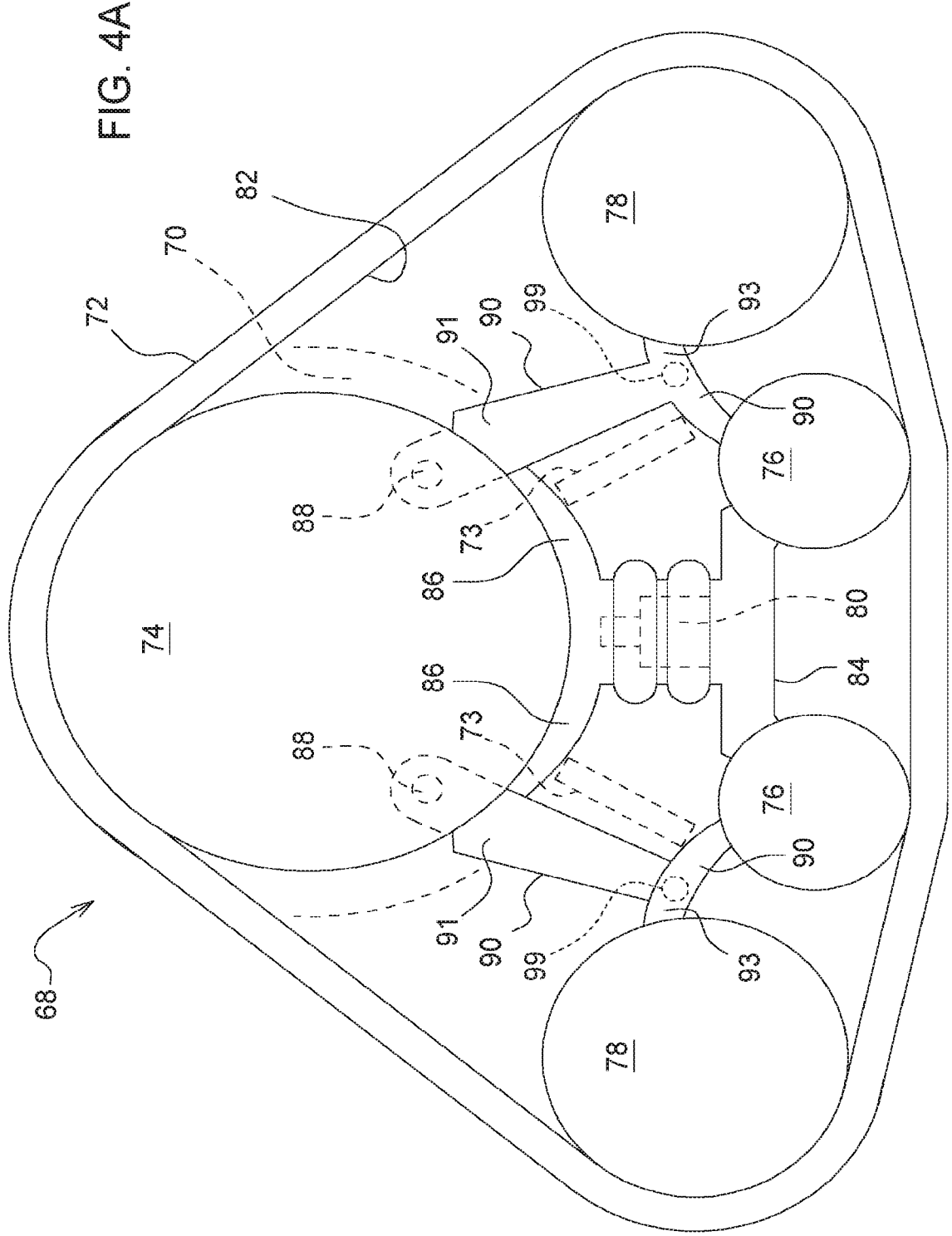

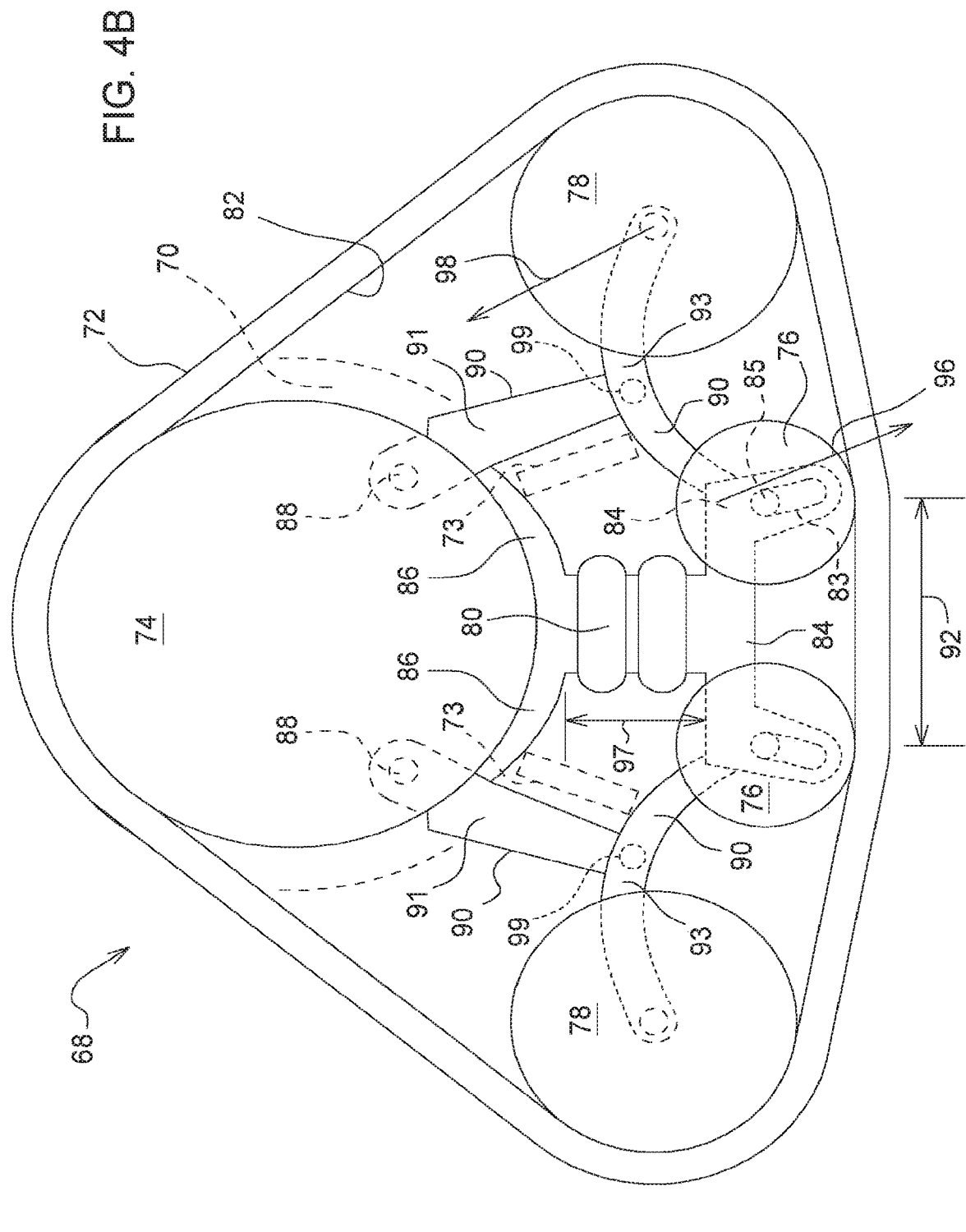

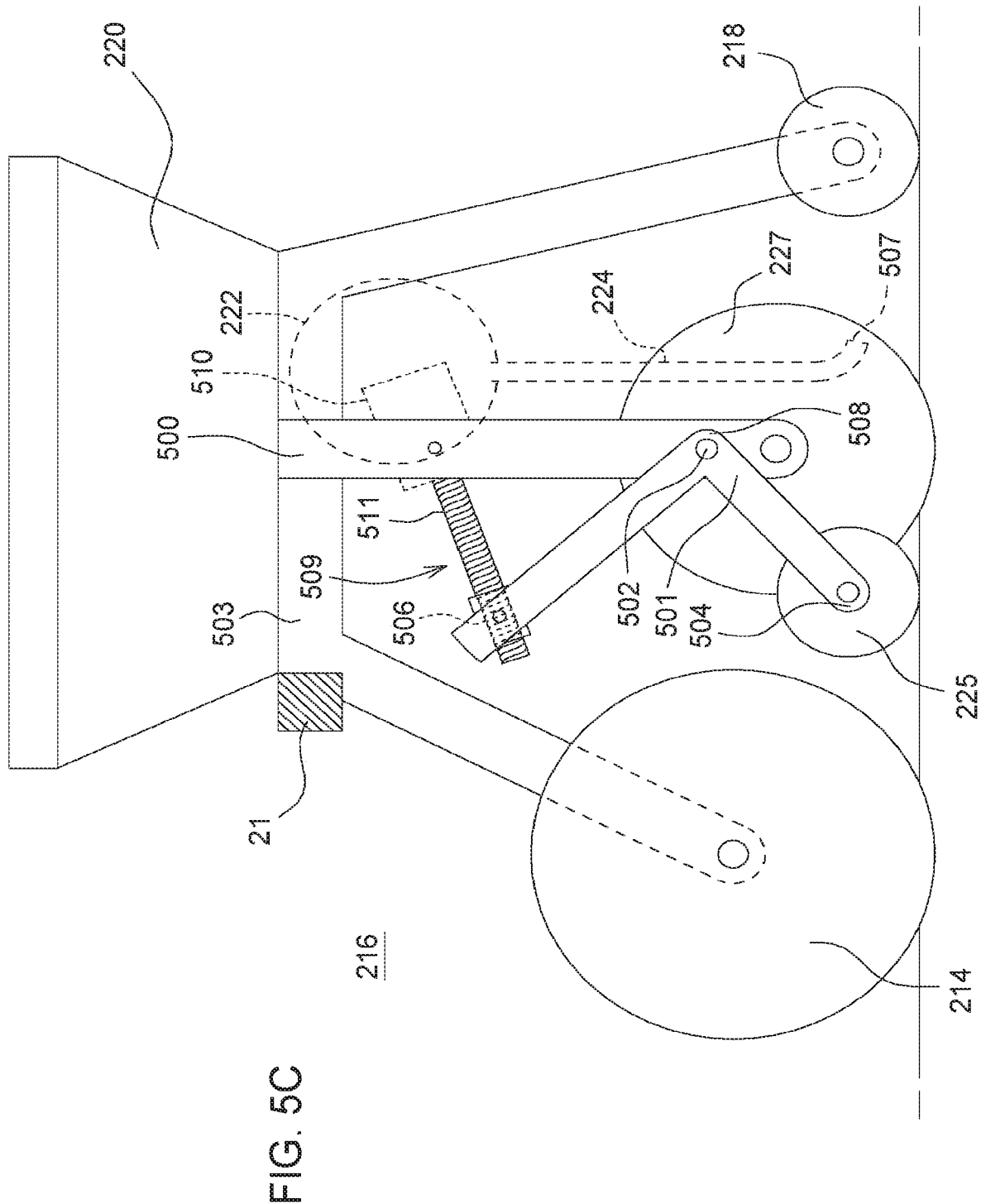

US 10,813,263 B2

AUTONOMOUS OR REMOTE-CONTROLLED VEHICLE PLATFORM FOR SPRAYING

CROSS-REFERENCE TO RELATED APPLICATIONS

This application (including the drawings) is a continuation of U.S. application Ser. No. 15/708,703, filed Sep. 19, 2017, pending, which claims priority and the benefit of the filing dated based on provisional application No. 62/511,549, filed May 26, 2017 under 35 U.S.C. § 119(e), where the entirety of each of these aforementioned applications, is hereby incorporated by reference herein.

FIELD OF INVENTION

This disclosure relates to an autonomous or remote controlled vehicle platform for spraying.

BACKGROUND

In some prior art, agricultural vehicles have a gantry configuration for suspending or supporting one or more implements for performing agricultural tasks. Certain prior art gantry configurations may lack lateral adjustment of the sprayer nozzles with respect to the vehicle, which can result in swaths of treated crop or spray patterns that are not parallel to each other or that do not track a target path plan, such as linear row segments, contour row segments, curved row segments or spiral row segments. Other prior art gantry configurations may be associated with wheels that unduly compact the soil, which can detract from favorable growing conditions of plants or crops. Thus, there is a need for a gantry configuration that provides lateral adjustment of the sprayer nozzles, while minimizing soil compaction.

SUMMARY

In accordance with one embodiment, a vehicle platform comprises a central body that can support one or more implement configurations, such as sprayer booms, or planting row units. A plurality of adjustable legs extends downward from the central body. Each adjustable leg has a corresponding leg actuator to adjust a respective vertical height of each adjustable leg. Each adjustable leg supports the central body. An arm assembly has a first end and a second end opposite the first end. The first end is pivotably coupled the central body and the second end coupled to a support beam. A plurality of nozzle assemblies is supported from the support beam. An arm actuator is arranged to control a transverse position of the support beam and the nozzle assemblies with respect to a reference point on the central body, such that each nozzle assembly may be aligned with a row of seeds or plants.

In accordance with another embodiment, each adjustable leg terminates in a track assembly wherein each track assembly comprises an outer belt or linked chains that forms a track or tread that can move or turn the vehicle with respect to the ground.

BRIEF DESCRIPTION OF THE DRAWINGS

FIG. 4A is side of view of a track assembly as viewed along reference line 4-4 of FIG. 1.

FIG. 4B is side of view of a track assembly of FIG. 4A wherein the ground contact area is contracted.

FIG. 5C is a side view of an enlarged portion of FIG. 5B within rectangular area labeled 5, as indicated by the dashed lines.

Like reference numbers in any set of drawings indicates like elements or features.

DETAILED DESCRIPTION

Figure 1:
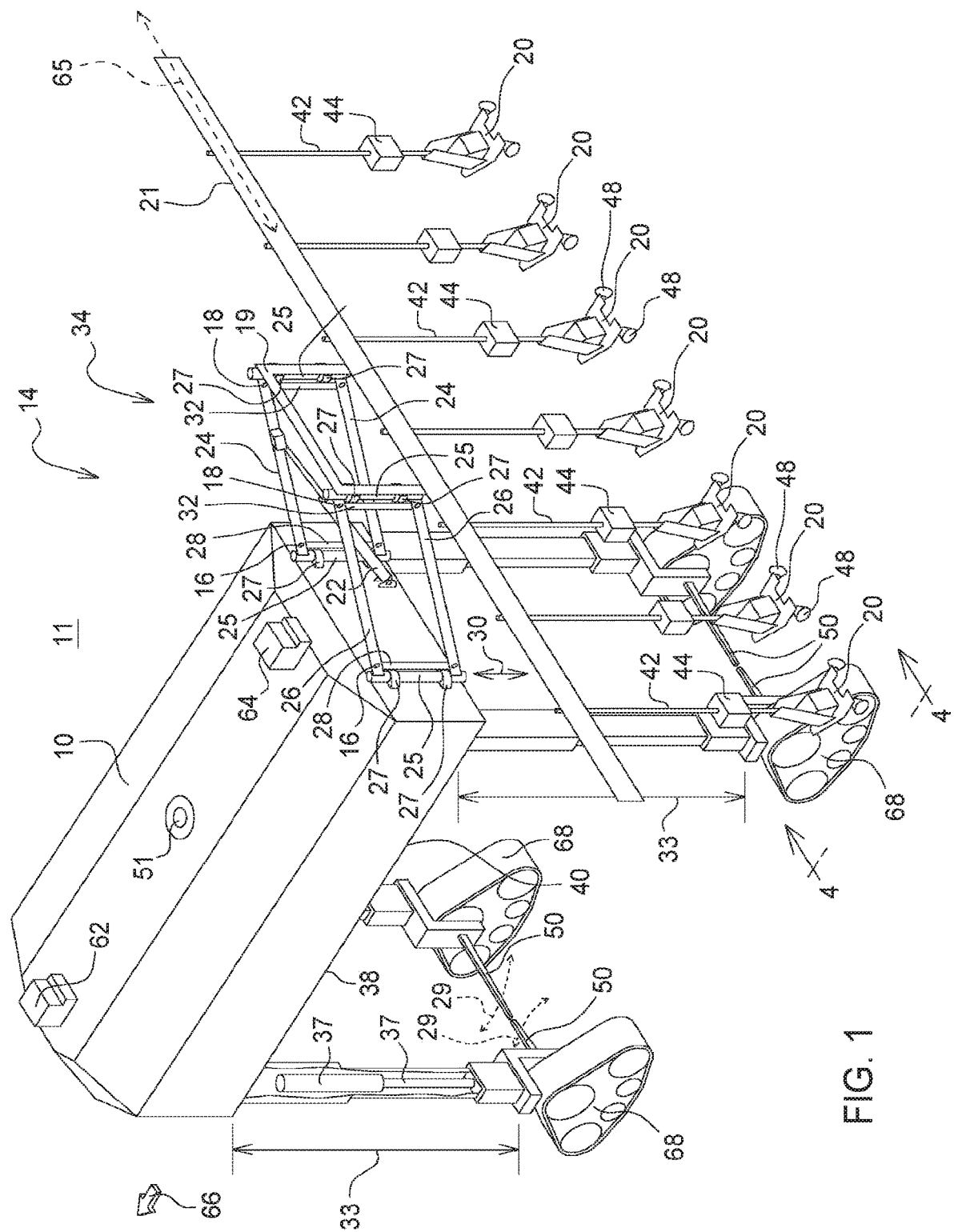
FIG. 1 is a perspective top, rear, and side view of one embodiment of an autonomous or remote-controlled vehicle, such as a sprayer.

In accordance with FIG. 1 through FIG. 3B, inclusive, one embodiment of a vehicle platform 11 comprises a central body 10. A plurality of adjustable legs 12 extends downward from the central body 10. Each adjustable leg 12 has a corresponding leg actuator 37, such as a linear actuator, an electric motor with a screw, or a hydraulic cylinder with an electrohydraulic interface, to adjust a respective vertical height 33 of each adjustable leg 12. For example, in a self-leveling control mode, the vehicle height control module 812 or the data processor 800 can control the leg actuators 37 to maintain a level attitude of the vehicle based on measurements of any of the following: motion sensors 846, first location-determining receiver 62, second location-determining receiver 64, or attitude and motion module 810. Further, in addition to the dynamic self-leveling of the vehicle, the vehicle height control module 812 or data processor 800 can dynamically adjust the vehicle height 33 commensurate with a crop height for spraying. In another embodiment, the planting depth for planting of seeds in the field can be adjusted by a plating depth adjustment mechanism 509 (in FIG. 5C) associated with a planting row unit 212. In one example, the data processor 800 is adapted to adjust a height of the adjustable legs 12, via respective actuators 37, such that a horizontal plane of the central body 10 of the vehicle is level, with respect to the ground, based on sensor data from a motion sensor 846, an accelerometer, a set of accelerometers, a gyroscope, an inertial measurement unit, or an inertial measurement unit associated with a location-determining receiver (62, 64). In another example, the vehicle height control module 812 or data processor 800 automatically changes the vehicle height by adjusting the adjustable legs 10, via corresponding actuators 37, responsive to crop height (e.g., observed crop height), plant maturity, or the time difference between the planting date and the current date of the crop when the vehicle is active in the field, which can be detected via sensors or imaging devices (e.g., stereo imaging device), or which may be entered via a user interface (e.g., keypad, touch screen, keyboard, pointing device and/or display) coupled to the data bus 802 or data ports 832. In one configuration, the time difference can be determined automatically by a clock and calendar application in the data storage device 804.

Each adjustable leg 12 supports the central body 10. An arm assembly 14 has a first end 16 and a second end 18 opposite the first end 16. The first end 16 is pivotably coupled the central body 10 and the second end 18 coupled to a support beam 21 via a frame 19. A plurality of nozzle assemblies 20 is supported from the support beam 21. An arm actuator 22 (e.g., hydraulic cylinder or linear actuator) is mounted to or between an arm (24, 26) and the central body 10 or otherwise arranged to control a transverse position of the support beam 21 and the nozzle assemblies 20 with respect to a reference point on the central body 10, such that each nozzle 20 assembly may be aligned with or directed toward a row of seeds or plants. As used in this document, the arm actuator 22 may be referred to as lateral implement actuator, where spraying, planting or another implement is coupled to the arm assembly 14.

In one embodiment, the pivotable arm assembly 14 comprises first arm 24, second arm 26, vertical rods 25, collars 27 and optional frame 19. For example, the pivotable arm assembly 14 comprises a first arm 24 (e.g., a first set of first arms) and a second arm 26 (e.g., a second set of second arms), where the first arm 24 is spaced apart and generally parallel to the second arm 26. The first arm 24 is associated with vertical rods 25 that interconnect an upper first arm and lower first arm. The first arm 24 and vertical rods 25 are connected by fasteners or welded together, for example. Similarly, the second arm 26 is associated with vertical rods 25 that interconnect an upper second arm and lower second arm. The second arm 26 and vertical rods 25 are connected by fasteners or welded together, for example. The vertical rods 25 can rotate about a vertical axis 30 with respect to collars 27, such as an upper collar and a lower collar that is associated with frame 19, of the implement, or the support beam 21. As illustrated in FIG. 1, the frame 19 is secured to the support beam 21. Additional collars 27 are secured to the central body 10 of the vehicle 11.

The first arm 24 and the second arm 26 each have a primary pivot point 28 about a generally vertical axis 30 of the vertical rods 25 within the respective collars 27 near the central body 10. The first arm 24 and the second arm 26 each have a secondary pivot point 32 about a generally vertical axis of the vertical rods 25 within the respective collars 27 near the support beam 21. For example, the first arm 24, the second arm 26, and the support beam 21 form three sides of a substantially trapezoidal structure 34, or a substantially parallelogram structure. Further, the fourth side of the trapezoidal structure 34 can be optionally formed by a side of the central body 10. As used in this document, references to a substantially trapezoidal structure shall be defined to include a parallelogram structure as a subset of trapezoidal structures.

Figure 2:
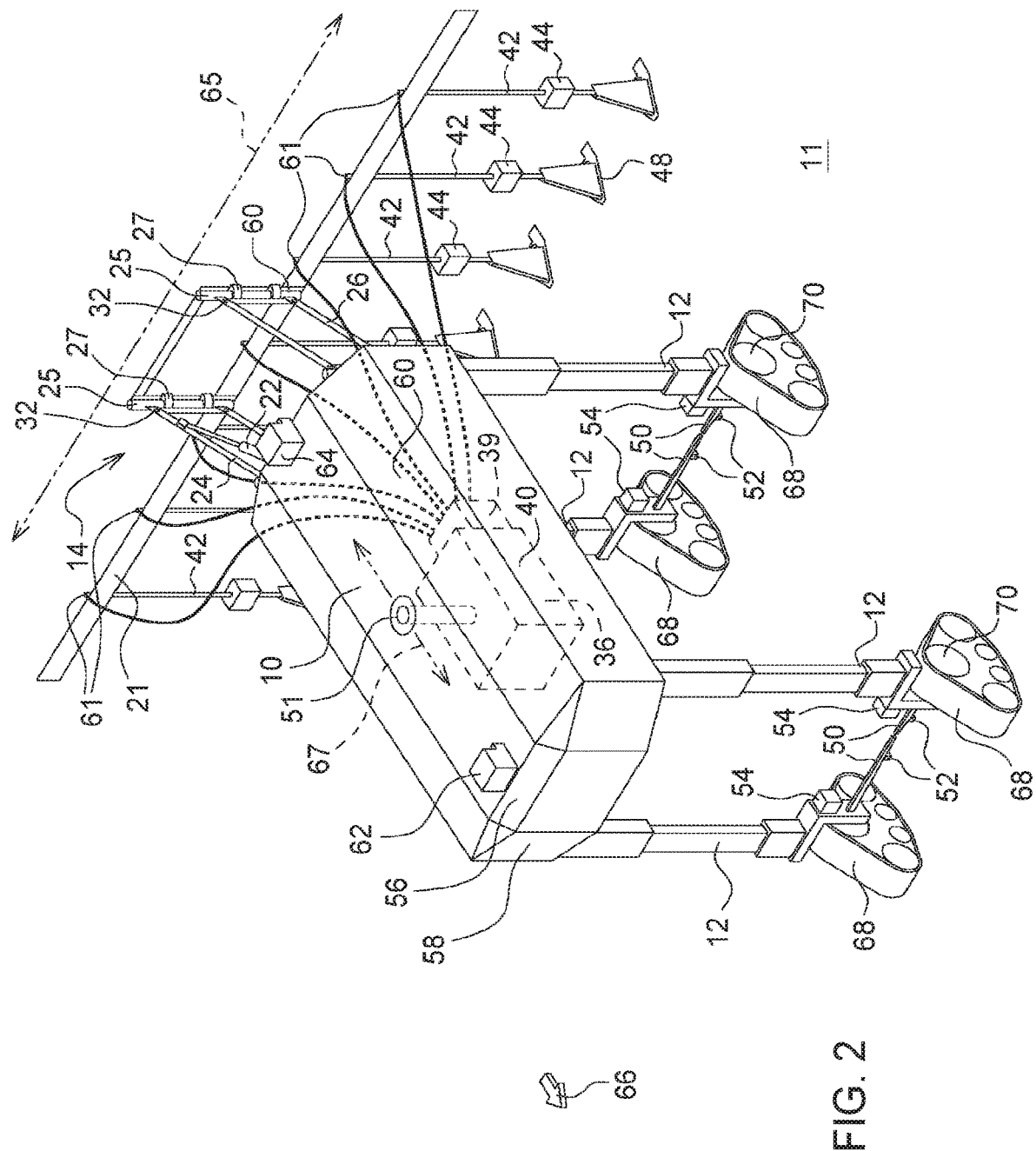
FIG. 2 is a perspective top, front, and side view of the autonomous or remote-controlled vehicle of FIG. 1.
Figure 3B:
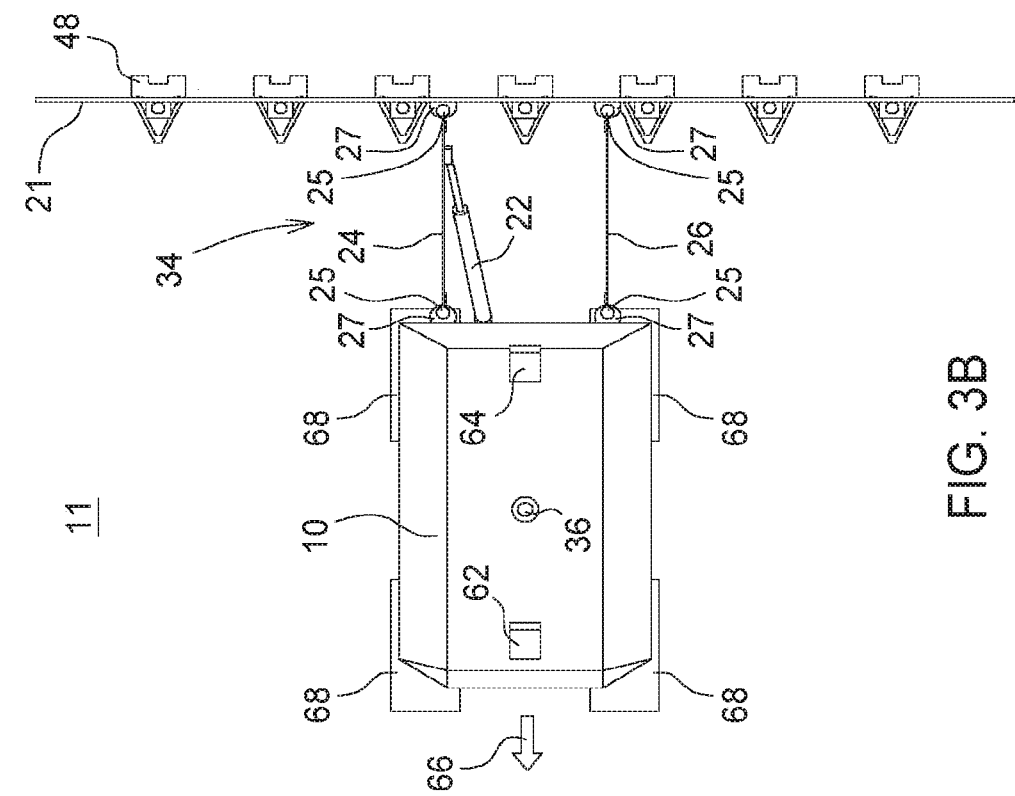
FIG. 3B is a plan view of the vehicle of FIG. 1.
Figure 3A:
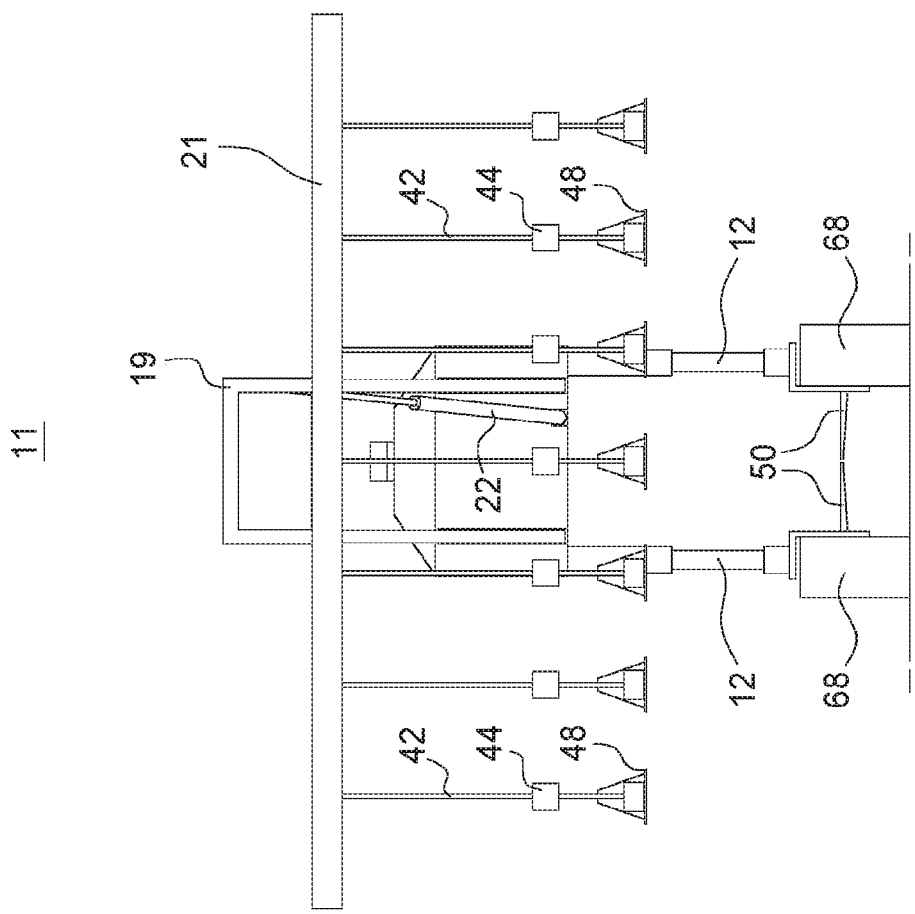
FIG. 3A is a rear elevation view of the vehicle of FIG. 1.

As illustrated in FIG. 2, the central body 10 covers a tank 36, such as a generally cylindrical tank, for holding a crop input, a fluid to be pumped or pressurized fluid, such as anhydrous ammonia. The crop may have an optional input port 51 with a cap that can be removed to fill the tank 36. Crop input or fluid refers to fertilizer, fungicide, pesticide, insecticide, herbicide, nitrogen, potassium, phosphorus, minerals, nutrients, soil amendments, chemicals or other agronomic treatments for plants, seeds, roots or soil. The tank 36 can hold a pressurized fluid or fluid to be pumped by a pump 39. In one configuration, the central body 10 has central hollow region 40 associated with its lower side 38, and wherein the central hollow region 40 is adapted to receive removably a tank 36 for holding fluid, such as a crop input to be sprayed or a seed to be planted.

A plurality of supply lines 42 and tubes 61 are arranged to supply the respective nozzle assemblies 20 with a pumped or pressurized fluid from the tank 36 or a pump associated with the tank 36. The vertical supply lines 42, tubes 61 and/or conduit are illustrated in FIG. 1. A manifold 44 coupled to the vertical supply lines 42 distributes, switches or directs the pumped or pressurized fluid to one or more nozzles 48 of each nozzle assembly 20 or to the entire nozzle assembly 20. The manifold 44 may include one or more valves, such as electromechanical valves or solenoid operated valves for controlling the flow of pumped or pressurized fluid to respective nozzles 48 or nozzle assemblies 20. For example, in one configuration each nozzle assembly 20 includes a pair of nozzles 48 facing in opposite directions As illustrated in FIG. 1, a pair of tactile arms 50 extends (e.g., inwardly) from respective pair of adjustable legs 12. Each tactile arm 50 is capable of pivoting, flexing or bending about a generally vertical axis near a corresponding adjustable leg 12. In one embodiment, a magnet 52 is secured to or embedded in each tactile arm 50. A magnetic field sensor 54 is spaced apart from the tactile arm 50 for generating tactile signal or tactile data representative of the position of the tactile arm 50 versus time in response to contact of the tactile arm with one or more plants in a row or the absence of one or more plants in a row. A vehicle on-board computer 56, data processor 800, or control system 801 is programmed for determining a position of the central body 10 or vehicle 11 with respect to one or more plants in a row based on the generated tactile signal or tactile data.

In one configuration, the central body 10 has a first side 58 (e.g., front) and a second side 60 (e.g., rear) spaced apart from the first side 58 by a fixed known distance. In one embodiment, a first location-determining receiver 62 is associated with or near the first side 58 on the top of the vehicle 11; a second location determining receiver 64 is associated with or near the second side 60 on top of the vehicle 11. The first location-determining receiver 62, alone or together with second location-determining receiver 64 is configured to determine a position or angular orientation in the horizontal plane of the Earth of the vehicle or central body 10 with respect to a reference angle, such as magnetic North. For example, the first location-determining receiver 62, the second location-determining receiver 64, or both may comprise a satellite navigation receiver, such as global navigation satellite system receiver (GNSS) or Global Positioning System (GPS) receiver, where the satellite navigation receiver may have a wireless receiver for receiving a correction signal, such as a differential correction signal or a precise point positioning (PPP) signal. In one embodiment, the location-determining receivers (62, 64) may be supplemented with additional or supplemental sensors, such as dead-reckoning sensors, odometers, gyroscopes, accelerometers, tilt, roll and yaw sensors, and/or inertial measurement unit (IMU) to facilitate determination of position or angular orientation in conjunction with the location-determining receivers (62, 64).

In one embodiment, the support beam 21 extends in a transverse direction 65 that is generally perpendicular to a longitudinal axis 67 of the central body 10 in a forward direction of travel 66 of the vehicle.

Each adjustable leg 12 terminates in a rotatable track assembly 68 (e.g. rotatable with respect to the vertical axis 30 and rotatable with respect to a horizontal axis associated with driving the track or belt) or rotatable wheel. If the track assembly 68 is rotatable with respect to the vertical axis to steer the vehicle, an actuator (e.g., hydraulic actuator) or electric motor is used at or above two or more track assemblies 68, such that a stator (of the electric motor or actuator) is associated with an upper portion of the leg 12 and rotor (of an electric motor or actuator) is coupled to a lower portion of the leg 12 or the respective tracked assembly. In some configurations, the track assembly 68 may be referred to as a tracked wheel, a continuous track or a tank tread. Each track assembly 68 is independently drivable or rotatable by a drive unit 70, such as an electric motor or a hydraulic motor. Further, in some configurations, the vehicle can be steered (e.g., differentially steered) by applying differential rotational energy (e.g., different rotational velocities) to the ground with respect to different track units. The differential steering can change the heading of the vehicle in accordance with commands from a vehicle guidance module 806 that are provided to the steering controller 822 via data port 832.

FIG. 4A is side of view of a track assembly as viewed along reference line 4-4 of FIG. 1. In accordance with FIG. 4A, each adjustable leg 12 terminates in a track assembly wherein each track assembly comprises an outer belt 72 or linked chains that forms a track or tread that can move or turn the vehicle with respect to the ground.

In one configuration, a track assembly comprises one or more of the following: an outer belt 72 or linked chain, a drive wheel 74, idler wheels 76, tensioner wheels 78, and an idler actuator 80 (e.g., air bag, pneumatic or hydraulic cylinder, or linear motor). The idler actuator 80 may be referred to as a track actuator or track footprint actuator. A drive wheel 74 (e.g., a cogged drive wheel or drive pulley) is associated with a rotational energy source or drive unit 70, such as an electric motor or hydraulic motor, the drive wheel 74 engaging with an inner surface 82 of the outer belt 72. A pair of idler wheels 76 (e.g., cogged idler wheels or idler pulleys) engages the inner surface 82 of the belt for rotating with the belt. A lower support 84 is arranged to support the idler wheels 76, where the idler wheels 76 are rotatable with respect to the lower support 84. An upper hub 86 is configured to support the drive wheel 74, where the drive wheel 74 is rotatable with respect to the upper hub 86. An idler actuator 80 extends between the lower support 84 and the upper hub 86 to adjust the tread area or longitudinal dimension of the tread in contact with the ground. Tensioner wheels 78 are pivotably mounted to the upper hub 86 for rotation about corresponding tensioner pivot points 88 in a generally horizontal axis. The tensioner wheels 78 are resiliently biased to maintain a target tension on the outer belt 72 against the drive wheel 74, the idler wheels 76 and the tensioner wheels 78.

In one embodiment, the tensioner wheels 78, or both the tensioner wheels 78 and the idler wheels 76, can pivot about pivot points 88 and optional secondary pivot points 99, which rotatably connect the levers (91, 93) of the lever assembly 90. The secondary pivot points 99 are shown as optional by the dashed lines.

In an alternate embodiment, the levers (91,93) are fastened together with one or more fasteners (e.g., at or near optional secondary pivot point 99) that do not permit the lever 91 to rotate with respect to the lever 93, such that the entire lever assembly 90 pivots about pivot point 88.

In one embodiment, track assembly 68 may comprise an optional resilient member 73 (e.g., elastomer), a pressurized shock absorber, a spring or an adjustable torsion bar for the target tension on the outer belt 72. The optional resilient member 73 may be located between the upper hub 86 and the lever assembly 90 (e.g., arms or levers 91, 93) as indicated by the dashed lines. For example, the resilient member 73 or the spring can be compressed by a threaded rod with a mechanical linkage that connects to the spring (e.g., between different coil portions of a coil spring) for adjustment of the target tension. Although the wheels are shown as pulleys, the wheels may be substituted for spockets, cogs or cogged wheels, particularly where the belt is replaced by a chain, or linked member.

In an alternate embodiment, the track assembly 68 may be associated with an accumulator hydraulically coupled to a hydraulic cylinder as actuator 80, where the accumulator can store pressurized hydraulic fluid in hydraulic communication with the pressurized side of the hydraulic cylinder to provide resilient biasing of the idler wheels 76, the tensioner wheels 78, or both.

Figure 4C:
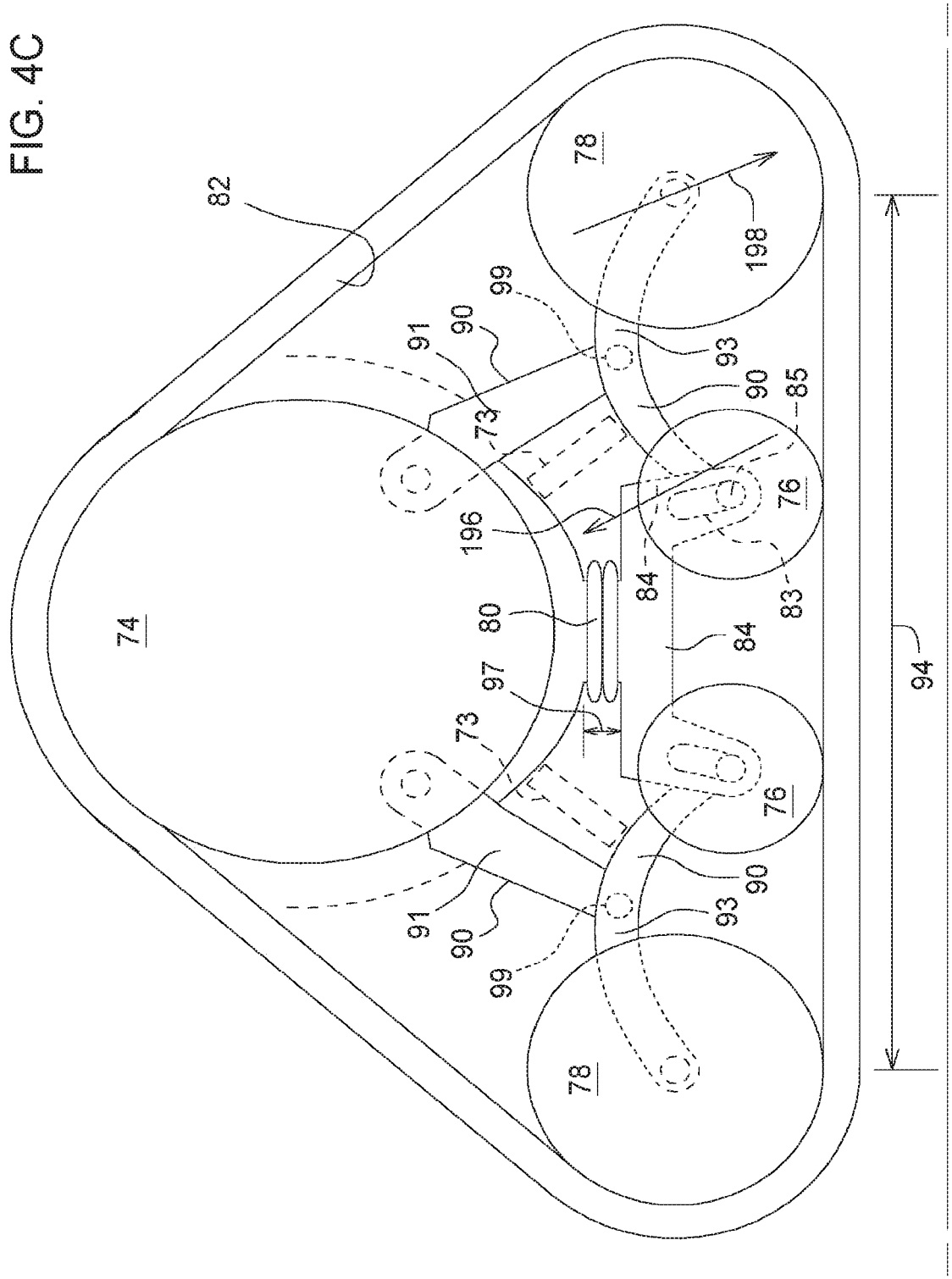
FIG. 4C is a side view of a track assembly of FIG. 4A wherein the ground contact area is expanded.

As illustrated in FIG. 4B, as the idler actuator 80 increases in height or length 97, the idler wheels 76 are pushed or forced downward (e.g., as indicated by arrows 96). Because of the lever assembly 90 or lever frame between the idler wheels 76 and the tensioner wheels 78, the tensioner wheels 78 can pivot or rotate upward about their respective pivot points 88 associated with the upper hub 86 (e.g., as indicated by arrows 98) and optionally about secondary pivot points 99. In one embodiment, the lower support 84 has respective slots 83 (e.g., curved slot) that slidably engage corresponding axles 85 of the idler wheels 76 to support rotation of the lever assembly 90 about one or more respective pivot points 88 and optionally about secondary pivot points 99. For example, if the idler actuator 80 increases its height or length to a maximum, that may coincide with the axle 85 engaging an upper limit of its corresponding slot 83. The tensioner wheels 78 keep the track tensioned to the target tension level and decrease the longitudinal track length 92, along or parallel to a longitudinal axis 67 of the vehicle or decrease the track surface area (e.g., longitudinally adjustable track contact area 94 in FIG. 4C) in contact with the ground as illustrated in FIG. 4B.

As illustrated in FIG. 4C, as the idler actuator 80 decreases in height or length 97, it lets the idler wheels 76 move upward about their respective pivot points 88 associated with the upper hub 86 (e.g., as indicate by arrow 196). Because of the lever assembly 90 or lever frame between the idler wheels 76 and tensioner wheels 78, the tensioner wheels 78 rotate downward (e.g., as indicated by arrow 196). In one embodiment, the lower support 84 has respective slots 83 (e.g., curved slot) that slidably engage corresponding axles 85 of the idler wheels 76 to support rotation of the lever assembly 90 about one or more respective pivot points 88 and optionally about secondary pivot points 99. For example, if the idler actuator 80 decreases its height or length to a minimum, that may coincide with the axle 85 engaging a lower limit of its corresponding slot 83. The downward movement or rotation keeps the track tensioned as well as increasing and maximizing the overall track length 92 (e.g., longitudinally adjustable track contact area 94) in contact with the ground.

In one embodiment, an on-board computer 56 or data processor of the vehicle can adjust the footprint, track length 92 or contact area 94 of the track assembly in contact with the ground on a dynamic basis as the vehicle moves through a field or other off-road work site. For example, the on-board computer 56, data processor 800 or operator of the vehicle can interact with a user interface or controls to use a greater surface area or maximum footprint of the track assembly 68 when the vehicle is moving in a straight line. Conversely, the on-board computer 56 or data processor 800 or operator of the vehicle can adjust the track assembly 68 to a lesser surface area of longitudinally adjustable track contact area 94, lesser track length of longitudinal track length 92, or minimum footprint of the track assembly in contact with the ground when turning the vehicle, to minimize the contact surface area when trying to steer a track, especially at zero or low velocity. Reducing the contact surface area (e.g., longitudinally adjustable track contact area 94) of the track assembly 68 during turning minimizes the power required to turn the track and maximizes the traction and floatation when needed as well.

Further, in an alternate embodiment, the on-board computer 56 or data processor 800 of the vehicle can adjust the footprint or longitudinally adjustable track contact area 94 of the track assembly to maximize the surface area in contact with the ground, consistent with FIG. 4C, to minimize the soil compaction by increasing or maximizing the aggregate or total surface area of the set of track assemblies 68. Decreasing soil compaction can be correlated with increased crop yields, healthier root development of plants, reduced expenses for soil cultivation, and possibly reduced soil erosion associated with any reduction in required soil cultivation.

Each adjustable leg 12 has a cross section selected from a substantially circular cross section, a substantially elliptical cross section, a substantially rectangular cross section, or a substantially polygonal cross section. In one embodiment, each adjustable leg 12 is hollow and has an actuator 37 located coaxially within the corresponding adjustable leg 12, wherein the actuator is a hydraulic actuator or a linear motor. In one embodiment, the actuator body of the actuator has radial holes or axial holes (e.g., threaded holes) for receiving fasteners to secure the actuator to a first portion of the leg 12; a movable, retractable rod end of the actuator is secured to a second portion of the leg by a mounting flange (e.g., radially extending mounting flange in a substantially horizontal plane, where the first portion and the second portion of the leg 12 are coaxially aligned and telescopically movable with respect to each other to adjust the height of each leg 12. Accordingly, based on operator input to a user interface or controls or plant height sensors (e.g., ultrasonic plant height sensors, scanning laser, LIDAR (e.g., light detection and ranging), or optical plant height sensors), the on-board computer 56 can adjust the height of the vehicle by adjusting, collectively or in tandem, the height of the legs 12. For example, the on-board computer 56 can dynamically adjust the height of the vehicle during a spraying operation to clear the leaf canopy, average or maximum height of plants within the field to avoid damage to the plants.

Figure 5A:
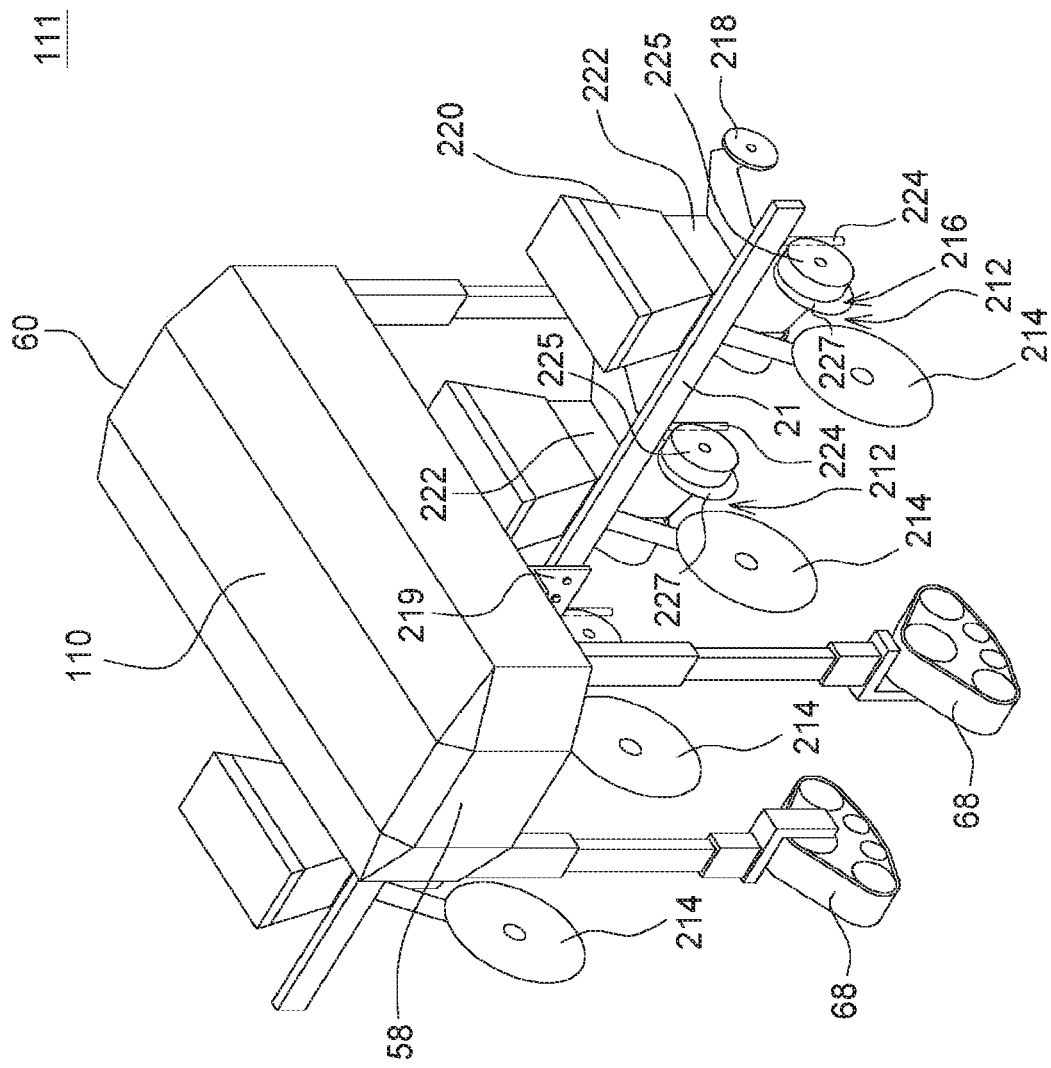
FIG. 5A is a perspective top, front and side view of another embodiment of the vehicle configured with planting row units.

FIG. 5A is a perspective top, front and side view of the vehicle 111 configured with planting row units 212. In accordance with one embodiment, a vehicle platform 11 comprises a central body 110 where adjustable legs 12 extend downward from the central body 110. Each adjustable leg 12 has a corresponding leg actuator to adjust a respective vertical height of each adjustable leg 12. Each adjustable leg 12 supports the central body 110.

A set of planting row units 212 are supported by or suspended from the central body 110 by bracket 219 via one or more fasteners. As illustrated in FIG. 5A, each planting row unit 212 is secured or fastened to support beam 21. In FIG. 5A, the vehicle 111 can adjust the lateral position of set of planting row units 212 by adjusting the lateral position of the vehicle 111 to adjust the spacing between the planted rows of seed in adjacent passes or swaths (e.g., parallel swaths) of the vehicle 111 through a field.

Figure 5B:
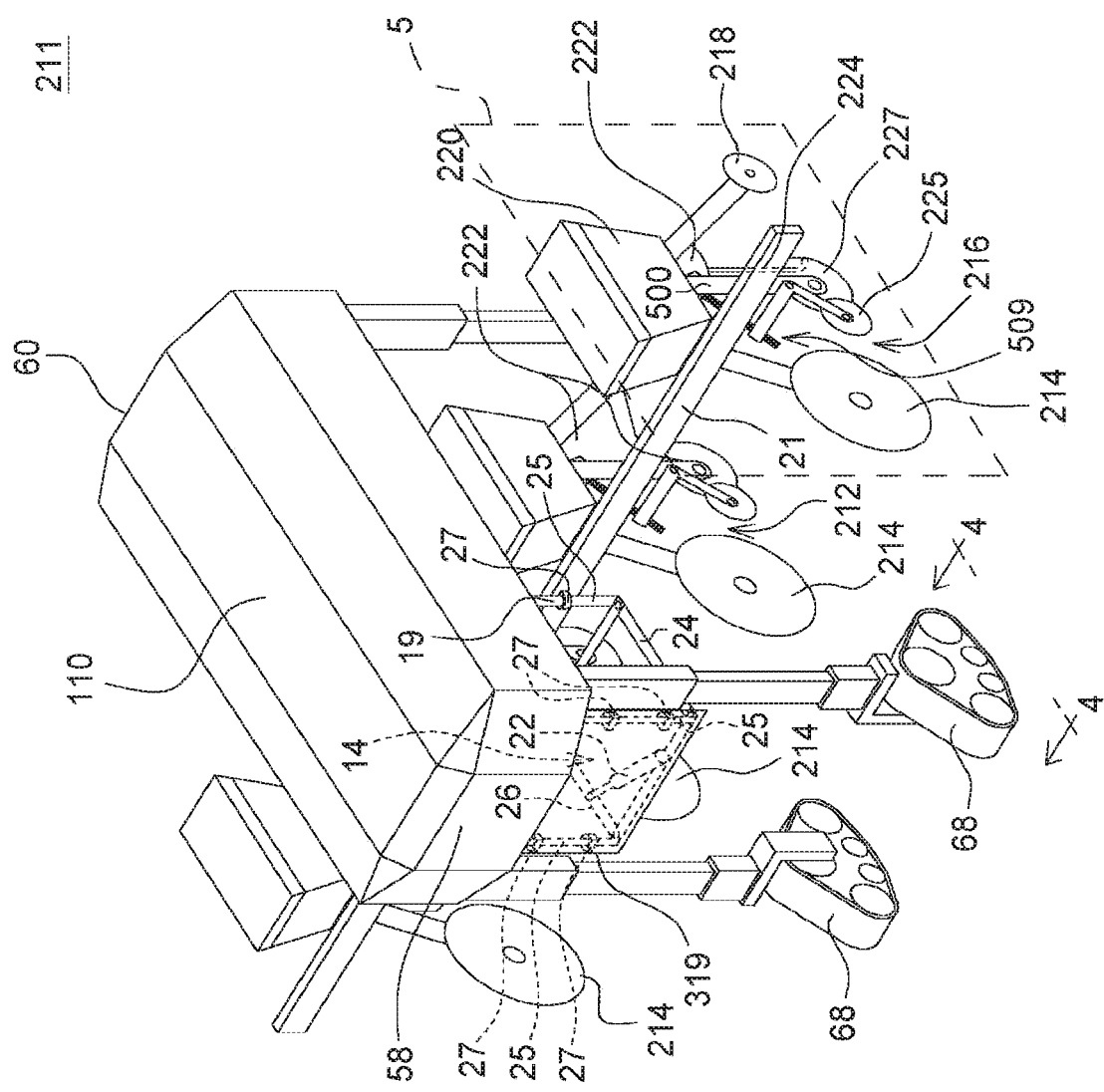
FIG. 5B is perspective view of yet another embodiment of the vehicle configured with planting row units that are laterally adjustable.

Each planting row unit 212 comprises an optional leading opener 214 (e.g., opener disc or coulter), a planting opener 227 (e.g., planting disc), or opener assembly (214, 227) for opening the soil or forming a furrow or groove in the soil. The planting row unit 212 further comprises a planting unit 216 for planting seed in the opened soil, such as the furrow or groove in the soil, and a closer 218 for closing or covering seed with soil, such as covering the furrow or the groove in the soil. The closer 218 may comprise one or more closing wheels to cover the seeds, close the soil over and around the seeds, or the firm the soil as the planting unit 216 progresses through the field. The planting unit 216 may refer to the combination of a planting opener 227, seed tube 224 and associated seed outlet (e.g., or another seed delivery mechanism), and a gauge wheel 225 that is associated with the planting opener 227 (e.g., an opener disc, coulter, knife or cutting member). The gauge wheel 225 comprises a depth wheel that establishes a depth of the planted seed in the soil, furrow or groove in the soil with respect to the surface of the surrounding soil or undisturbed soil elevation above a bottom the furrow or groove. Although the gauge wheel 225 may be mounted forward, rearward or in line (e.g., concentrically or eccentrically) with the planting opener 277, as illustrated in FIG. 5A the gauge wheel 225 is mounted frontward with respect to the planting opener. The gauge wheel 225 can be mounted or secured to the planting row unit 212 to provide a fixed planting depth or an adjustable planting depth, where FIG. 5B and FIG. 5C show gauge wheel 225 with an illustrative depth adjustment mechanism for adjusting the planting depth in greater detail.

In one configuration, the opener 214 and the planting opener 227 can be configured as coulters, which are stationary or rotatable. The planting row unit comprises a bin 220 for holding seed. The bin 220 is coupled to a seed metering unit 222 for controlling the rate of seed provided to a seed outlet (e.g., 507 in FIG. 5C) associated with or near a planting opener (e.g., planting opener). The seed metering unit 222 can be fed with seeds by gravity from the bin 220, for example. In an alternate embodiment, each of the seed bins 220 for respective row units 212 may be optionally pneumatically fed from bulk seed storage container in or on the central body 212. In one configuration, the planting row units 212 are placed laterally apart from each other to simultaneously plant multiple rows of seeds at once.

As in FIG. 1, the central body 110 has a first side 58 and a second side 60 spaced apart from the first side 58 by a fixed known distance, wherein a first location-determining receiver 62 is associated with the first side 58 and wherein a second location-determining receiver 64 is associated with the second side 60. The first location-determining receiver 62, alone or together with second location-determining receiver 64 is configured to determine a position or angular orientation in the horizontal plane of the Earth of the vehicle or central body 110 with respect to a reference angle, such as magnetic North.

As illustrated, each adjustable leg 12 terminates in a track assembly or wheel. Each track assembly 68 is independently drivable or rotatable by a drive unit 70, such as an electric motor or a hydraulic motor. The track assembly of FIG. 1, FIG. 5A, and FIG. 5B can be identical. Like reference numbers in FIG. 1, FIG. 5A and FIG. 5B indicate like elements.

FIG. 5B is perspective view of yet another embodiment of the vehicle 211 configured with planting row units 212. The vehicle 211 is similar to vehicle 111, except the vehicle 211 has a pivotable arm assembly 14 for lateral adjustment of the set of row units 212. The pivotable arm assembly 14 is coupled between the bracket 319 and the support beam 21 to allow lateral adjustment of the support beam 21 and the planting row units 212 secured to the support beam 21. The pivotable arm assembly 14 has a first end and a second end opposite the first end. The first end is pivotably coupled the bracket 319 or central body 110 and the second end is coupled to the support beam 21, directly or via frame 19. In the pivotable arm assembly 14, the first arm 24, the second arm 26, and the support beam 21 form three sides of a substantially trapezoidal structure (or a substantially parallelogram structure) and wherein the fourth side of the trapezoidal structure is optionally formed by a bracket 219 that extends downward from the central body 110.

In one embodiment, the arm actuator 22 has its ends secured between an arm (24, 26) of the pivotable arm assembly 14 and the central body 110 or the bracket 219 to adjust the lateral position of the support beam 21; hence, the lateral position of the row units 212 are secured to the support beam with respect to the central body 110. Accordingly, during adjacent passes or swaths (e.g., parallel swaths) of the vehicle 211 through the field, for the vehicle configuration of FIG. 5B and FIG. 5C, the data processor 800 can adjust the lateral position of adjacent rows of the seeds or plants without laterally moving the track assemblies 68. Still, just as in FIG. 5C, the vehicle configuration of FIG. 5B and FIG. 5C can adjust the lateral position of the vehicle 111 to adjust the spacing between the planted rows of seed in adjacent passes or swaths. An arm actuator 22 is arranged to control a transverse position of the support beam 21 and the planting row units with respect to a reference point on the central body 110, such that planting row unit 212 may be aligned with a set of target positions for a row of seeds or plants. In one embodiment, the data processor 800 or vehicle guidance module 806 can make lateral adjustment of the planting row units with respect to the vehicle to result in planted rows of seeds or swaths that are substantially parallel to each other or that track a target path plan, such as linear row segments, contour row segments, curved row segments and/or spiral row segments that are stored in a data storage device 804.

FIG. 5C is a side view of an enlarged portion of FIG. 5B within rectangular area labeled 5, as indicated by the dashed lines. In one embodiment, the gauge wheel 225 has an adjustable planting depth for the planting opener 227 and the seed tube 224. The gauge wheel 225 can be mounted in front of the planting opener 227 or to the rear of the planting opener 227, such as trailing the seed tube 224 and seed tube outlet 507. In one configuration, the planting opener 227 is mounted on a support 500 that extends downward from frame or support structure 503; a vertex end 508 of forked arm 501 (e.g., V-shaped arm) can rotate about a pivot point 502 associated with the support 500, a first distal end 504 of the forked arm 501 is associated with (e.g., supports the rotation of) the gauge wheel 225 and a second distal end 506 of the forked arm 501 is associated with a depth actuator or depth adjustment mechanism 509. The depth adjustment mechanism 509 comprises one or more of the following: threaded rod, a threaded bolt, a manual adjustment mechanism, a depth actuator, a linear actuator, a linear motor, electrohydraulic cylinder, or electric motor with its rotor coupled to the screw, and electric motor with its rotor coupled to the threaded bolt. If the threaded bolt, threaded rod or manual adjustment mechanism is used without an electric motor, a user of the vehicle can manually adjust the planting depth of seeds when the vehicle is stationary, whereas if the threaded rod 511 is driven by an electric motor 510, the data processor 800 can automatically and dynamically adjust the planting depth by sending a data message or signal to the depth adjustment mechanism 509 (e.g., depth actuator) via the data ports 832. In FIG. 5C, the motor 510 is indicated in dashed lines to show it is optional. In one embodiment, the depth adjustment mechanism 509 (e.g., depth actuator) is coupled between the second distal end 506 of the forked arm 501 (e.g., at a female threaded bore that can pivot about a substantially horizontal axis via a pin that engage a bore in the forked arm 501) and the support 500 and can adjust the distance between the second distal end 506 of forked arm 501 and support 500 to rotate the forked arm with respect to the pivot point 502; hence, the gauge wheel 225 about a pivot point 502 associated with a forked arm 501.

Figure 6:
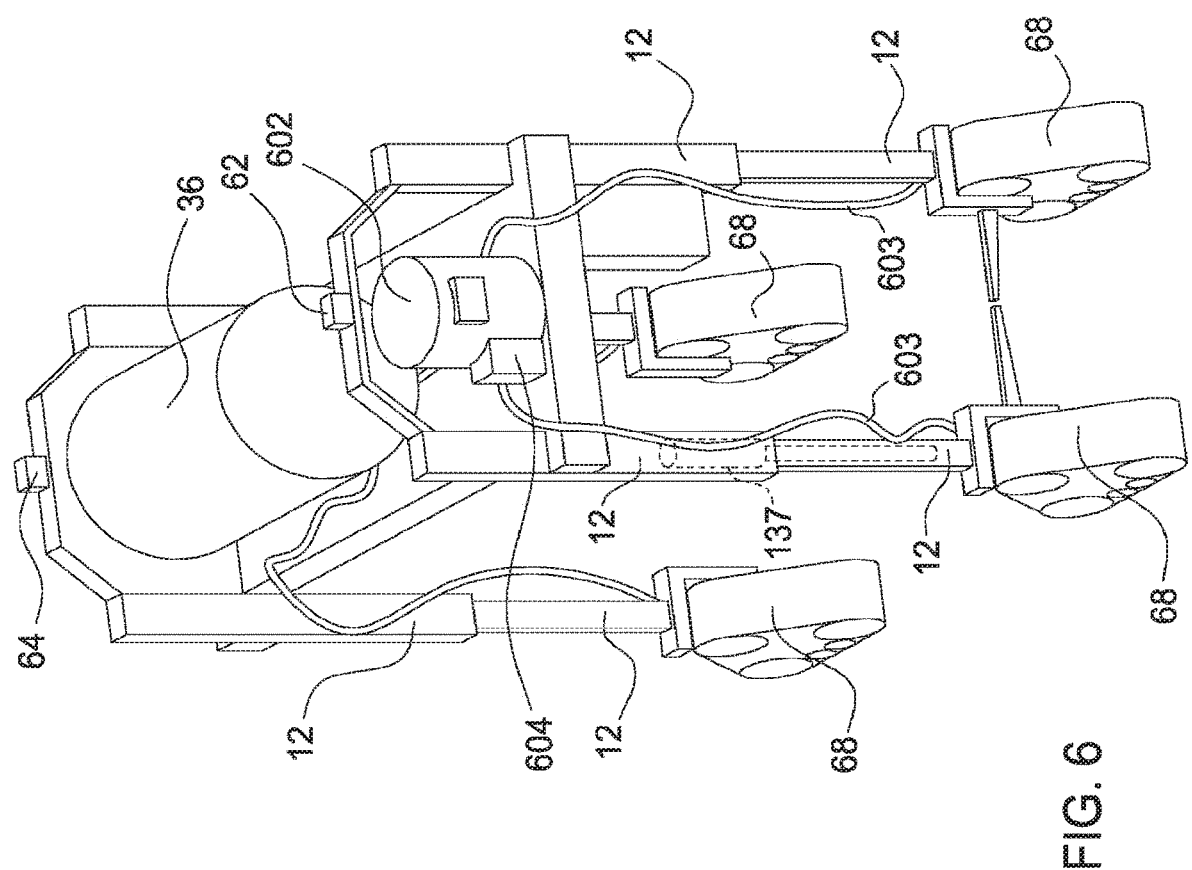
FIG. 6 is a front perspective view of an alternate embodiment of a vehicle which illustrates legs with rectangular cross-sections.

FIG. 6 is a front perspective view of an alternate embodiment of a vehicle 311 which illustrates legs 12 with rectangular cross-sections. Although the adjustable leg 12 of FIG. 6 has a generally rectangular a cross section in FIG. 6, in alternate embodiments the adjustable leg 12 may have a cross section selected from a substantially circular cross section, a substantially elliptical cross section, a substantially rectangular cross section, or a substantially polygonal cross section. In one embodiment, hollow adjustable legs (e.g., 12) have telescopic or coaxial, telescopic alignment to support vertical height adjustment. For example, in one configuration, each adjustable leg (e.g., 12) is hollow and has an actuator 137 located coaxially within the corresponding adjustable leg, wherein the actuator is a hydraulic actuator 137 or a linear motor. As illustrated in FIG. 6, an output shaft of internal combustion engine 602 is coupled to hydraulic pump 604. Further the hydraulic pump 604 provides pressurized hydraulic fluid via hydraulic lines 603 to the hydraulic actuators 137 for height adjustment in each leg 12 and for driving a drive unit 70, such as hydraulic motor or hydraulic actuator (e.g., near hub 86), at each tracked assembly 68 via hydraulic lines 603.

Figure 7:
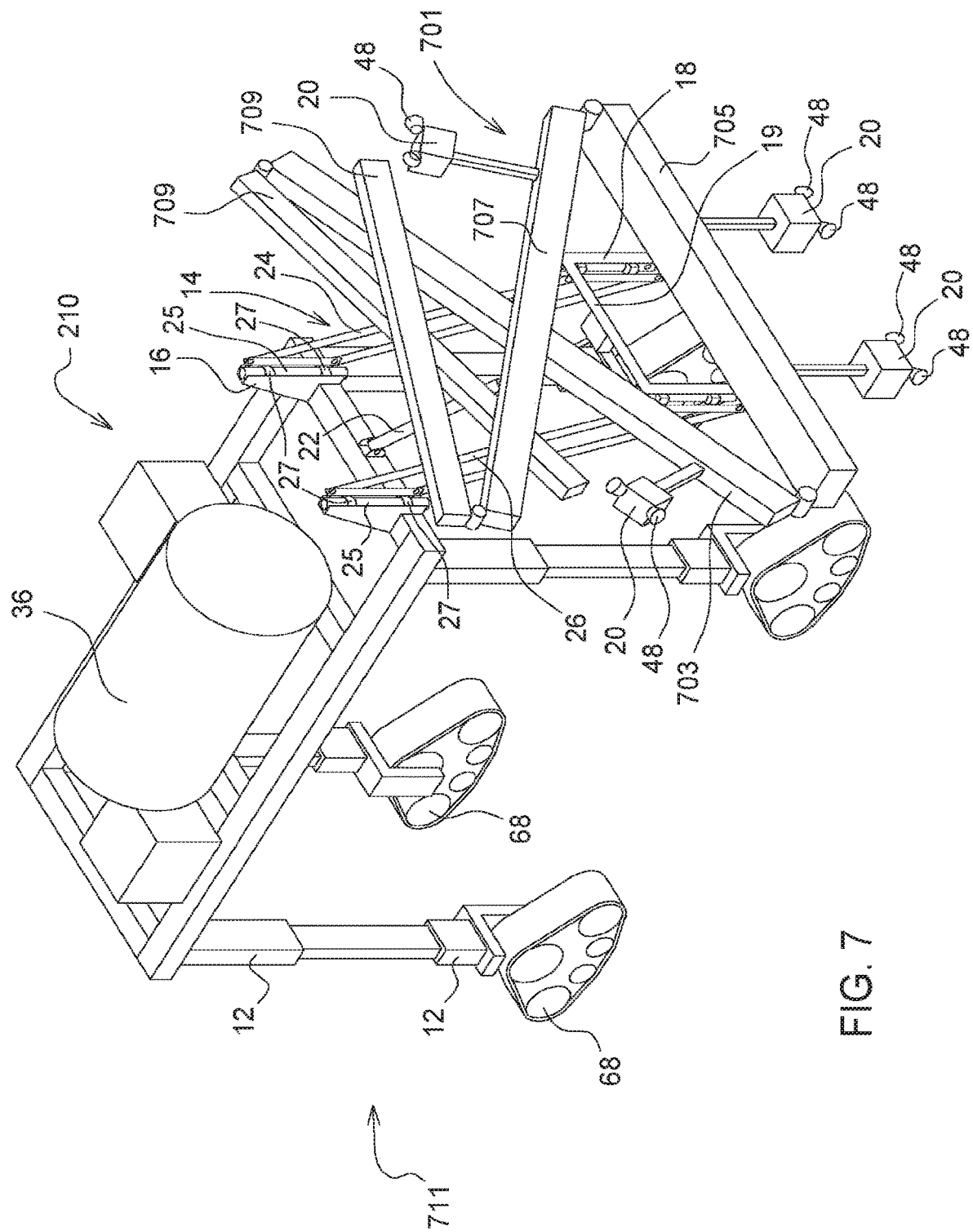
FIG. 7 is a perspective view of another alternate embodiment of the vehicle which illustrates a framework of a sprayer boom implement that can support a set of nozzles or Y-drop set of nozzles.

FIG. 7 is a perspective view of another alternate embodiment of the vehicle 711 which illustrates a framework 701 of a sprayer boom implement that can support nozzle assemblies 20, such as a set of nozzles 48 or Y-drop set of nozzles. In one embodiment, a vehicle platform 711 comprises a central body 210 and a set of adjustable legs 12 extending downward from the central body 210. Each adjustable leg 12 has a corresponding leg actuator to adjust a respective vertical height of each adjustable leg 12. Each adjustable leg 12 supports the central body 210.

An arm assembly 14 has a first end 16 and a second end 18 opposite the first end 16. The first end 16 is pivotably coupled to the central body 110 via vertical rods 25 and collars 27 that rotatably engage the vertical rods 25, the collars 27 are connected to the central body 210 or its frame. Similarly, the second end 18 is pivotably coupled to a framework 701 via vertical rods 25 and collars that rotatably engage the vertical rods. The collars are connected to the framework 701 directly, or via framework 19, which is secured to the framework 701. A plurality of nozzle assemblies 20 is supported from the framework 701. An arm actuator is arranged for controlling a transverse position of the framework and the nozzle assemblies with respect to a reference point on the central body 210, such that each nozzle assembly may be aligned with a row of seeds or plants. In one embodiment, the framework 701 comprises a center or intermediate section 705 that supports a first outer section 703 and a second outer section 707. The first outer section 703 and the second outer section 707 are wing structures that have hinges or joints to fold upward with respect to the intermediate section 705. In an alternate embodiment, additional outer sections 709 may be attached rotatably to the framework 701 (e.g., at hinges) to provide additional lateral coverage or swath width for one pass of the vehicle 711.

In the embodiments disclosed in this document, a vehicle may comprise an autonomous robotic machine that is capable of applying fertilizer, herbicides, pesticides, seeds, or other crop care inputs both prior to crop planting and emergence as well as after crop emergence. The vehicle platform or vehicle can be configured as a light-weight vehicle that is well-suited for reduced soil compaction during field operations, by eliminating the weight of a cab for the human operator and operator. For many configurations, the robotic machine can sheds the weight of climate control systems, infotainment systems and various operator controls associated with the cab. In some configurations, the tracked assemblies of the vehicle can provide less than 5 pounds per square inch (PSI) ground pressure or even as low as 3 PSI ground pressure in certain configurations. Accordingly, nitrogen can be applied to crop at critical times, even when the soil structure would not normally allow field entrance because of concerns over soil compression or damage. Further, the use of the vehicle could eliminate the need for primary tillage; hence, improving soil health, microbial activity, and earthworm population.

The embodiments of the vehicle disclosed in this document support travel in any direction via the innovative track assembly with or without the dynamically adjustable ground contact area (e.g., contact area 94). For example, each leg 12 can support rotation (e.g., up to 180 degrees) of the tracked assembly 68 about a vertical axis and/or differential rotation of one or more track assemblies.

If the orthogonal orientations of the vehicles are configured to have different track widths between adjacent track assemblies that are transverse to the direction of travel (e.g., direction of travel 66), the track widths of the vehicle can be changed by simply rotating the vehicle 90 degrees with respect to an initial or original travel direction via the track assemblies, provided that the spraying implement or the planting row units can be rotated, similarly, or turned off while the vehicle adjusts its position in a 90 degree orthogonal transit mode.

The vehicle is well suited for improved or simplified headland management practice of a field by steering of the track assemblies to attain a 90 degrees rotation of the vehicle from headland to the central or main portion of the field. The 90 degrees of rotation may be more readily and accurately achieved without steering error associated with conventional Ackerman steering systems, for example.

Each embodiment of the vehicle can be configured to raise and lower the body to clear crop, adjust to side hill operation to maintain a level body via independent leg adjust, and to lower down to replace, exchange or pick up a full liquid tank (e.g., tank 36), dry product, planter, or other mounted attachment as necessary. For a side hill, one or more legs 12 may have different heights (e.g., relative to ground) than other legs to maintain a level body of the vehicle. The removable tank connection could be done via a job box, where this job box is a proprietary self-connection mechanism to vehicle and contains all required inputs for a particular job or task.

The job box can include chemicals, seed, fertilizer, batteries, fuel, oil, sensors, tools, or any other input required for that task. The task could be defined as a specific job for a specific amount of time and area. The vehicle can support dispersing a job or agricultural task among multiple machines within a field or multiple fields to perform a job via swarm technology.

Figure 8A:
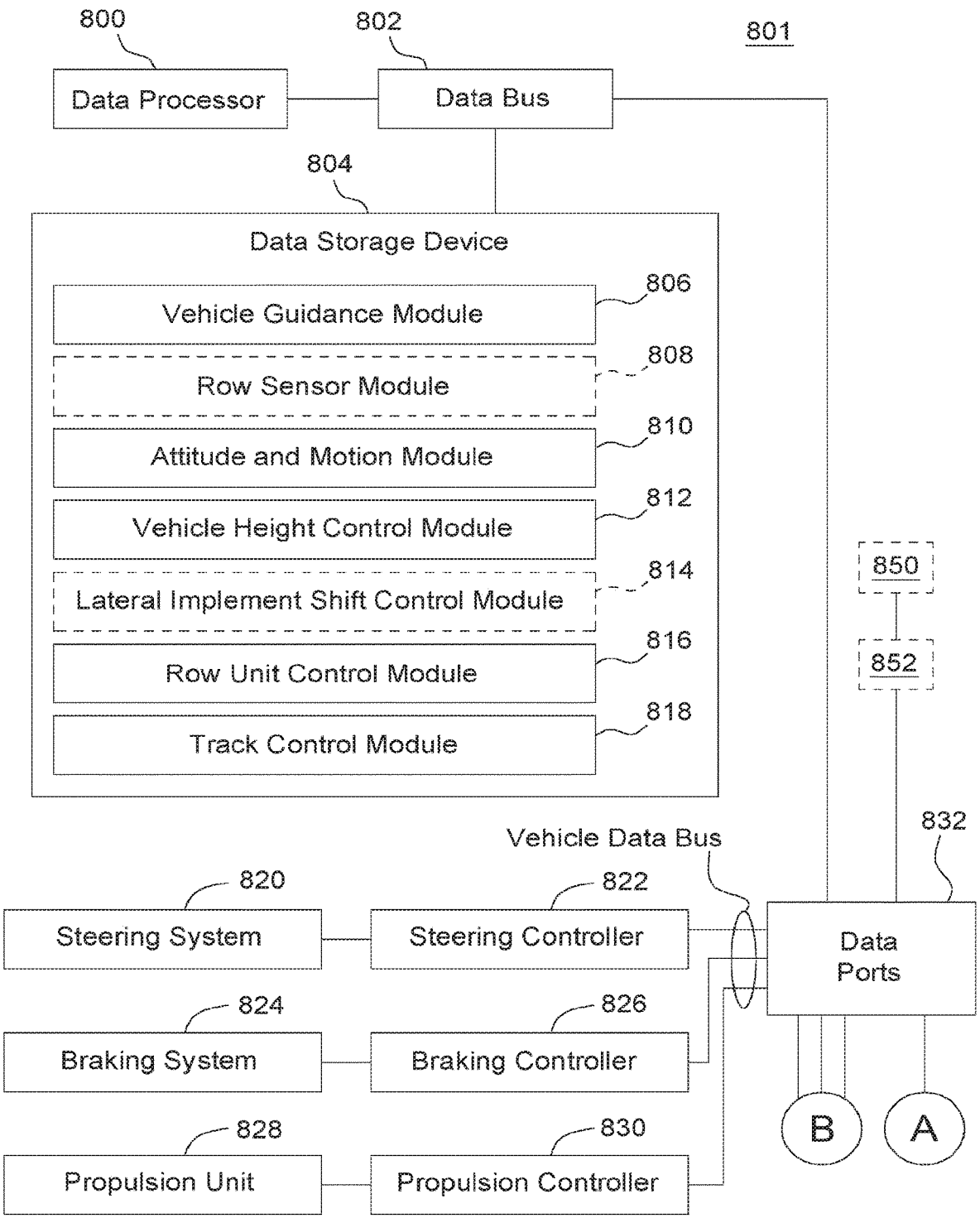
FIG. 8A and FIG. 8B (collectively FIG. 8) are a block diagram of a control system for the autonomous or remote-controlled vehicle.
Figure 8B:
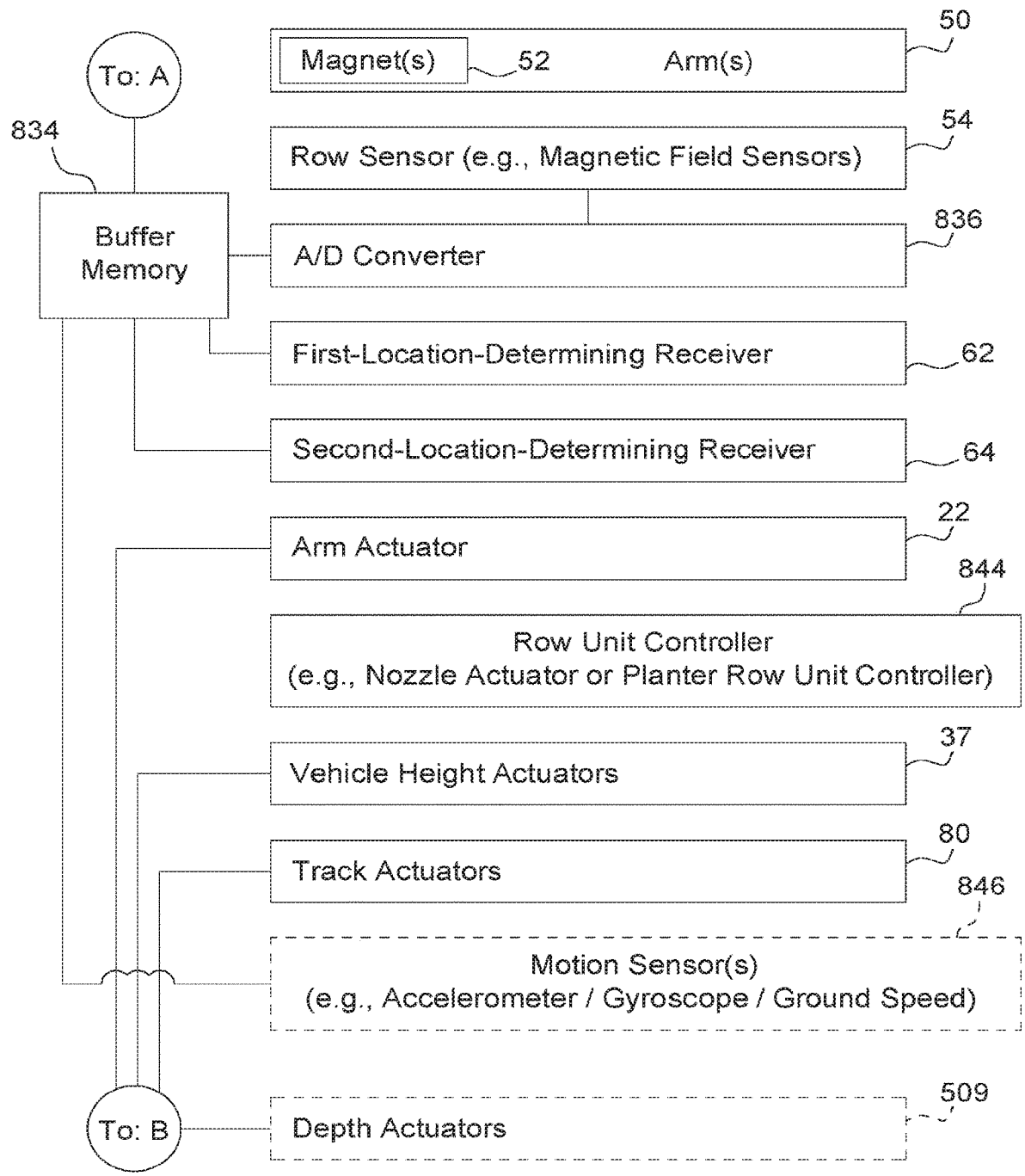

FIG. 8A and FIG. 8B (collectively FIG. 8) are a block diagram of a control system for the autonomous or remote-controlled vehicle. In one embodiment, the control system comprises a data processor 800, a data storage device 804, and data ports 832 that are coupled to a data bus 802. The data processor 800, data storage device 804, and data ports 832 can communicate with each other via the data bus 802.

In one embodiment, the data processor 800 comprises a microcontroller, a microprocessor, a programmable logic array, a logic device, an arithmetic logic unit, a digital signal processor, an application specific integrated circuit, or another electronic device for inputting, outputting, processing or manipulating data. The data storage device 804 may comprise electronic memory, nonvolatile random access memory, a magnetic storage device, a magnetic disc drive, an optical storage device, an optical disc drive, or another suitable storage device or medium. The data ports 832 may comprise a transceiver, the combination of a transceiver and buffer memory, or a transmitter and a receiver, for example.

The data storage device 804 can support electronic modules, store software instructions or support data modules, such as one or more of the following: a vehicle guidance module 806, a row sensor module 808, an attitude and motion module 810, a vehicle height control module 812, a lateral implement control module 814 (e.g., for lateral position shifting of the implement), a row unit control module 816 and a track control module 818.

In one embodiment, the vehicle guidance module 806 accesses, creates or receives a path plan to guide the vehicle along a target path in performing spraying, planting or another task in one or more fields. The target path may be defined by three dimensional geographic coordinates, way points, linear segments, curved segments, linear equations, or quadratic equations that describe the target path or target positions of the vehicle. For example, the target path plan may track a back-and-forth pattern with end row turns that covers substantially an entire area of a field within boundaries that define the field.

The vehicle guidance module 806 receives position data, motion data, and attitude data (e.g., yaw or heading) from the first location-determining receiver 62, the second location-determining receiver 64, the row sensor 54, the motion sensors 846, or the attitude and motion module 810. For example, buffer memory 834 may store observed (e.g., time-stamped) position data, motion data, and attitude data (e.g., yaw or heading) from the first location-determining receiver 62, the second location-determining receiver 64, row sensor 54, and/or the motion sensors 846 for communication via the data ports 832 to the data processor 800 or any module or modules within the data storage device 804. The vehicle guidance module 806 generates command data or command signals to send steering commands to the steering controller 822 to track the path plan, target heading or target yaw. In turn, the steering controller 822 communicates with the steering system 820, such as an electrohydraulic steering system or an electrical steering system. In one example, the steering system 820 comprises an electric motor that drives one or more tracks, where the direction of the vehicle can be controlled by differential steering with respect to the tracks to steer or direct the vehicle in accordance with a target heading provided by the vehicle guidance module 806 or data processor 800. In another example, the steering system 820 comprises an actuator that rotates a portion, such as bottom portion of a respective leg 12 about a vertical axis to steer or direct the vehicle in accordance with a target heading provided by the vehicle guidance module 806 or data processor 800 consistent with a path plan to cover a field or area with a crop input.

The vehicle guidance module 806 can send command data or command signals to the steering controller 822, the braking controller 826, and the propulsion controller 830 via one or more data ports 832 or via the vehicle data bus 831 such that the vehicle tracks a path plan. A braking controller 826 is coupled to a braking system 824, such as an electro-hydraulic braking system, an electrical braking system or a mechanical braking system. The braking controller 826 is coupled to a data port 832. A propulsion controller 830 is coupled to a propulsion unit 828, such as one more electric drive motors, an internal combustion engine, or an internal combustion engine that provides rotational mechanical energy to a generator or an alternator that provides electrical energy to one or more electric drive motors. The propulsion controller 830 is coupled to a data port 832.

The attitude and motion module 810 can estimate any of the following: (1) the attitude, including the roll, pitch and yaw angles of the vehicle for a sampling interval, (2) yaw rate of change for a sampling interval, and (3) the motion parameters of the vehicle, such as ground speed, velocity and acceleration for a sampling interval based on measurements or observations of the first location-determining receiver 62, the second location determining receiver 64 an any motion sensors 846. For example, the motion sensors 846 may comprise one or more accelerometers, a gyroscope, an inertial measurement unit, an inertial measurement unit of a location-determining receiver, or a set of accelerometers associated with multiple orthogonal axes.

The row sensor module 808 may be used to process tactile sensor readings associated with a row sensor for sensing a row of plants or crop. For example, the row sensor may comprise one or more tactile arms 50 with corresponding magnets 52 secured to or within the tactile arms 50. A respective magnetic field sensor 54 is positioned proximately to the magnets 52 to detect magnetic field measurements (e.g., variations in the observed magnetic fields associated with the magnets 52) when the arms 50 strike, are deflected from, or interact with the presence of absence of a row of plants. As illustrated in FIG. 1, the tactile arms 50 are associated with a corresponding row of plants (not shown), and a single row unit, nozzle or nozzle assembly of the vehicle. The row sensor module 808 can provide an indication as to whether the vehicle is laterally aligned with respect to one or more rows of plants and can accordingly provide a lateral offset to adjust alignment of the vehicle with respect to row of plants. The row sensor 54 may provide an analog data signal to an analog-to-digital converter 836, which in turn provides a digital signal to row sensor module 808 for processing, via the buffer memory 834 or data ports 832. The row sensor module 808 is not used if the vehicle is used for planting, as opposed to spraying one or more existing rows of plants or crop.

Although a pair of tactile arms 50 are associated with the adjustable legs 12, in an alternate embodiment multiple pairs of tactile arms 50 can be used or suspended from the implement support beam 21 or vertical supply lines 42 to align with multiple corresponding rows of plants, for example.

The vehicle height control module 812 receives attitude data, such as the roll, tilt and yaw angles, for the vehicle from the first location-determining receiver 62, the second location-determining receiver 64, from the motion sensors 846, or from the attitude and motion module 810. The vehicle height control module 812 can send control signals or control data messages to the vehicle height actuators 37 (e.g., hydraulic cylinders) associated with or within each leg of the vehicle to maintain a level attitude of the vehicle or an attitude that tracks or mimics the attitude of the terrain or land over which the vehicle travels.

In one embodiment, the vehicle height control module 812 can adjust the vehicle height or height of one or more legs to accommodate an appropriate boom height or sprayer bar height that is commensurate with the plant height of the plants to be sprayed to avoid damaging of the plants and to properly apply the crop treatment (e.g., fertilizer, pesticide, insecticide, or herbicide). In another embodiment, the row unit control module 816 or data processor 800 can send a signal or data message to the height adjustment mechanism 509 (e.g., height actuator) to facilitate planting of seeds to a proper target depth and to maintain proper tracking (e.g., avoiding undesired draft steering from interaction of the opener (214, 227) with the ground) of a target guidance path, such as target A-B guidance line between points A and B, or contour guidance line.

In one embodiment, the lateral implement control module 814 receives lateral position data of a sprayer nozzle with respect to one or more plant rows from the row sensor module 808 or a target offset of the lateral position between the plant row and the sprayer nozzle to achieve proper application of crop treatment to one or more plant rows. Further, the lateral implement control module 814 can generate a control signal or data message to cause the arm actuator 22 to move the support beam 21 and associated nozzles 48 laterally for alignment with one or more plant rows or a target offset with respect to one or more plant rows.

In one configuration, the row unit control module 816 can activate, deactivate or adjust the spray characteristics of one or more nozzles of the vehicle based on the a prescription plan or agronomic plan for applying crop inputs or treatments to the plants, where the prescription plan may vary based on zones within a field or work area. For example, the row unit control module 816 can send a signal or data message to the manifold 44 or a row unit controller 844; the manifold 44 can activate one or two nozzles of each row unit, where the manifold may comprise one or more electrohydraulic valves. In one configuration, the row unit controller 844 comprises a nozzle valve controlled by a valve actuator, such as servo-motor. In another configuration, the row unit controller 844 comprises a planter row unit controller to activate or control one or more planting row units 212.

For a remote-controlled control system, an optional user interface 850 may be coupled to the data port 832 via an optional wireless link 852, such as a pair of wireless transceivers. The user interface 850 may comprise a display, keypad, touch screen display, keyboard, pointing device, or another device to support an operator remotely controlling the vehicle (11, 111 or 211). The user interface 850 and the wireless link 852 are shown in dashed lines to indicate they are optional.

Figure 9:
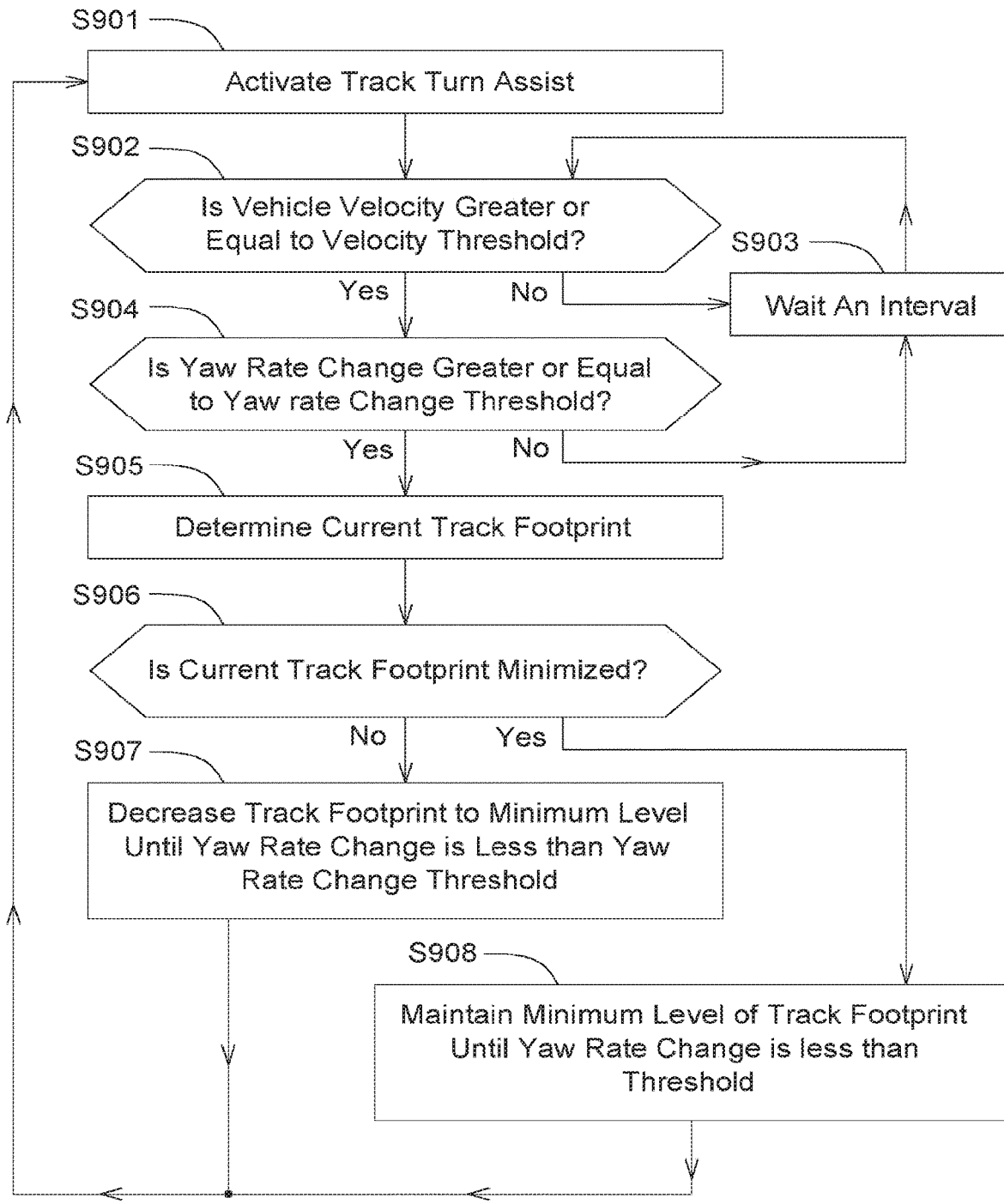
FIG. 9 is flow chart of method for controlling a track assembly of the autonomous or remote-controlled vehicle.

FIG. 9 describes an illustrative example of how the track control module 818 operates in the second mode or during track turn assist mode to send control signals or control data messages to one or more track idler actuators or idler actuators 80 via the data ports 832.

FIG. 9 is flow chart of method for controlling a track assembly of the autonomous or remote-controlled vehicle. In one configuration, the data processor 800 is adapted to dynamically adjust a track contact area in contact with the ground in response to observed vehicle ground speed with respect to a threshold speed and an observed yaw rate change with respect to a threshold yaw rate change. The method of FIG. 9 begins in step S901.

In step S901, the data processor 800, the vehicle guidance module 806, or the track control module 818 activates a track-turn-assist mode (e.g., second mode) that can dynamically adjust the track contact area (e.g., or longitudinal contact length 92, 94) in contact with the ground on one or more tracked assemblies 68 associated with corresponding adjustable legs 12 (e.g., vertically adjustable) of the vehicle. In one embodiment, the track control module 818 operates in a first mode or a second mode. In a first mode, the track control module 818 does not assist or adjust the footprint or track contact area of the track in contact with the ground to assist turning of the vehicle in accordance with a target heading or target yaw. The data processor 800, vehicle guidance module 806 or the track control module 818, or vehicle operator (if any) may select or program the first mode if the field conditions are wet, slippery or otherwise can benefit from full or maximum contact area of the footprint of the track with the ground. In a second mode, the track control module 818 assists or adjusts the footprint of the track or track contact area in contact with the ground to assist turning of the vehicle in accordance with a target heading or target yaw.

In step S902, the track control module 818 or the electronic data processor 800 determines if the vehicle velocity is greater than or equal to a velocity threshold. If the vehicle velocity is greater than or equal to the velocity threshold, the method continues with step S904. However, if the vehicle velocity is not greater than the velocity threshold or is less than the velocity threshold, the method continues with step S903. For instance, the velocity threshold is set to assure that the track-assist mode or second mode results in proper turning of the vehicle and does not result in binding or sticking of the track contact area with respect to the ground.

In step S903, the track control module 818 or the data processor 800 waits for an interval prior to returning to step S902.

In step S904, the track control module 818 or the data processor 800 determines whether the observed yaw rate change is greater than or equal to a yaw rate change threshold. For example, the first location-determining receiver 62, the second location-determining receiver 64, the motion sensors 846, and/or the attitude and motion module 810 may provide the observed yaw rate change, whereas the yaw rate change threshold may comprise a user-definable setting, a factory setting, or an empirical setting based on field studies. In one example, the yaw rate change threshold is set to determine if the vehicle is changing its heading more than approximately ten degrees within a corresponding time period or sampling interval, where approximately means a tolerance of plus or minus about ten percent. If the observed yaw rate change is greater than or equal to the yaw rate change threshold, then the method continues with step S905. However, if the observed yaw rate change is not greater or equal to the yaw rate threshold, the method continues with step S903.

In step S905, the track control module 818 or data processor 800 observes or estimates the current track footprint of one or more tracked assemblies 68 with respect to a minimum track footprint (e.g., minimum longitudinal track length 92 or minimum track contact area) and maximum track footprint (e.g., maximum longitudinal track length 94 or maximum track contact area). For example, the track control module 818 or data processor 800 observes or estimates whether or not the current contact area of the track in contact with the ground is a minimum contact area or a maximum contact area based on the position of an actuator in one or more tracked assemblies, or based on a position sensor associated with a corresponding actuator in a respective tracked assembly.

In step S906, the track control module 818 or the data processor 800 determines whether or not a current track footprint or track contact area is minimized or not. If the current track footprint is minimized or if the track contact area in contact with the ground is at a minimum contact area, then the method continues with step S908. However, if the current track footprint is not minimized, the method continues with step S907.

In step S907, the track control module 818 or the data processor 800 decreases the track footprint or track contact area of one or more track assemblies 68 with the ground to a minimum track contact area (e.g., minimum level or minimum longitudinal track length 92) until the observed yaw rate change is less than the yaw rate change threshold.

Step S907 may be carried out in accordance with one or more techniques that may be carried out separately and cumulatively. Under a first technique, the data processor 800 is adapted to reduce or minimize the track contact area in contact with the ground for a time period if the vehicle ground speed is greater or equal to a velocity threshold, if the yaw rate change is greater than or equal to the yaw rate change threshold, and if the current track contact area is not minimized. Under a second technique, the time period of the minimized track contact area is limited to a time period until the yaw rate change is less than the yaw rate change threshold. Under a third technique, once the observed yaw rate change is less than the yaw rate change threshold, the track contact area may be restored to the previous setting prior to any decrease in the track footprint or track contact area initiated in step S907. After step S907, the method may return to step S901, for instance.

In step S908, the track control module 818 or the data processor 800 maintains a minimum level or minimum track contact area of the track footprint until the observed yaw rate change is less than the observed yaw rate change threshold. Step S908 may be carried out in accordance with various techniques, which may be applied separately or cumulatively. Under a first technique, once the observed yaw rate change is less than the yaw rate change threshold, the track control module 818 or the data processor 800 can be programmed to revert or change the track contact area with respect to the ground to the maximum contact area or maximum footprint of the respective tracked assembly. Under a second technique, once the observed yaw rate change is less than the yaw rate change threshold, the track control module 818 or the data processor 800 can be programmed to revert or change the track contact area in contact with the ground to an average, mean or medium contact area or an average, mean or medium footprint of the respective tracked assembly.

Having described the preferred embodiment, it will become apparent that various modifications can be made without departing from the scope of the invention as defined in the accompanying claims.

The following is claimed:

1. A vehicle platform comprising:
   a central body;
   a plurality of adjustable legs extending downward from the central body, each adjustable leg terminating in a rotatable track assembly and positioned to support the central body;
   an arm assembly pivotably coupled to the central body and in communication with a plurality of nozzle assemblies, wherein the arm assembly is adjustable relative to the central body such that each nozzle assembly may be aligned with a row of seeds or plants independently of a position of the rotatable track assemblies relative to the row of seeds or plants; and
   a control system configured for remote-control or autonomous operation of the vehicle platform, wherein the vehicle platform is formed without a cab for an operator.

2. The vehicle platform according to claim 1, further comprising:
   a support beam supporting the plurality of nozzle assemblies, wherein the arm assembly comprises a first end and a second end opposite the first end, the first end pivotally coupled to the central body and the second end coupled to the support beam; and
   wherein a first arm spaced apart and generally parallel to a second arm, the first arm and the second arm each having a primary pivot point about a generally vertical axis near the central body, the first arm and the second arm each having a secondary pivot point about a generally vertical axis near the support beam.

3. The vehicle platform according to claim 2 wherein the first arm, the second arm, and the support beam form three sides of a substantially trapezoidal structure and wherein a fourth side of the trapezoidal structure is optionally formed by a side of the central body.

4. The vehicle platform according to claim 2, wherein the support beam extends in a transverse direction that is generally perpendicular to a longitudinal axis of the central body in a forward direction of travel of the vehicle.

5. The vehicle platform according to claim 1, further comprising:
   a tank for holding pressurized fluid or fluid to be pumped;
   a plurality of supply lines for supplying the plurality of nozzle assemblies with a pumped or pressurized fluid; and
   a manifold for directing the pumped or pressurized fluid to one or more nozzles of each nozzle assembly, wherein each nozzle assembly includes a pair of nozzles facing in opposite directions.

6. The vehicle platform according to claim 1, further comprising:
   a pair of tactile arms extending from respective pair of adjustable legs, each tactile arm capable of pivoting about a generally vertical axis near a corresponding adjustable leg;
   a magnet secured or embedded in each tactile arm;
   a magnetic field sensor spaced apart from the tactile arm for generating a tactile signal or tactile data representative of the position of the tactile arm versus time in response to contact of the tactile arm with one or more plants in a row or the absence of one or more plants in a row; and
   wherein the control system further comprises a data processor for determining a position of the central body or vehicle with respect to one or more plants in a row based on the generated tactile signal or tactile data.

7. The vehicle platform according to claim 1, wherein the central body has a first side and a second side spaced apart from the first side by a fixed known distance, wherein a first location-determining receiver is associated with the first side and wherein a second location determining receiver is associated with the second side, the first location-determining receiver, alone or together with second location-determining receiver configured to determine a position or angular orientation in the horizontal plane of the Earth of the vehicle or central body with respect to a reference angle, such as magnetic North.

8. The vehicle platform according to claim 1, wherein the central body has central hollow region associated with its lower side, and wherein the central hollow region is adapted to receive removably a tank for holding fluid, such as a crop input to be sprayed or a seed to be planted.

9. The vehicle platform according to claim 1 wherein each track assembly is independently drivable or rotatable by a drive unit, such as an electric motor or a hydraulic motor.

10. The vehicle platform according to claim 1, wherein each track assembly comprises:
    an outer belt or linked chains that forms a track or tread that can move or turn the vehicle with respect to the ground;
    a drive wheel associated with a rotational energy source, such as an electric motor or hydraulic motor, the drive wheel engaging with an inner surface of the outer belt;
    a pair of idler wheels for engaging the inner surface of the belt and for rotating with the belt; a lower support for supporting the idler wheels, where the idler wheels are rotatable with respect to the lower support;
    an upper hub for supporting the drive wheel, the drive wheel rotatable with respect to the upper hub;
    an idler actuator extending between the lower support and the upper hub to adjust a tread area or longitudinal dimension of the tread in contact with the ground; and
    tensioner wheels pivotably mounted to the upper hub for rotation about a pivot point in a generally horizontal axis, the tensioner wheels resiliently biased to maintain a target tension on the outer belt against the drive wheel, the idler wheels and the tensioner wheels.

11. The vehicle platform according to claim 10, further comprising a resilient member, a spring or an adjustable torsion bar for the target tension on the outer belt.

12. The vehicle platform according to claim 11, wherein the resilient member or the spring can be compressed by a threaded rod with a mechanical linkage that connects to the spring for adjustment of the target tension.

13. The vehicle platform according to claim 1, wherein each of adjustable legs has a cross section selected from a substantially circular cross section, a substantially elliptical cross section, a substantially rectangular cross section, or a substantially polygonal cross section.

14. The vehicle platform according to claim 1, wherein each adjustable leg is hollow and has an actuator located coaxially within a corresponding adjustable leg, wherein the actuator is a hydraulic actuator or a linear motor.

15. The vehicle platform according to claim 1, wherein the control system is adapted to adjust a height of the adjustable legs such that a horizontal plane of the central body is level, with respect to the ground, based on sensor data from a motion sensor, an accelerometer, a set of accelerometers, a gyroscope, an inertial measurement unit, or an inertial measurement unit associated with a location-determining receiver.

16. The vehicle platform according to claim 1, wherein the control system is adapted to automatically change a height by adjusting a height of the adjustable legs responsive to crop height, plant maturity, or a time difference between a planting date and a current date of a crop when the vehicle is active in a field.

17. The vehicle platform according to claim 1, wherein the control system is adapted to dynamically adjust a track contact area in contact with the ground in response to observed vehicle ground speed with respect to a threshold speed and in response to an observed yaw rate change with respect to a threshold yaw rate change.

18. The vehicle platform according to claim 17, wherein the control system is adapted to reduce or minimize the track contact area in contact with the ground for a time period if a vehicle ground speed of the vehicle platform is greater or equal to a velocity threshold, if the yaw rate change is greater than or equal to the yaw rate change threshold, and if a current track contact area is not minimized.

19. The vehicle platform according to claim 18, wherein the time period of the minimized track contact area is limited to a time period until the yaw rate change is less than the yaw rate change threshold.

20. The vehicle platform of claim 1, wherein a weight of the vehicle platform is distributed across the plurality of adjustable legs such that a ground pressure at each rotatable track assembly is less than 5 pounds per square inch.

21. The vehicle platform according to claim 1 wherein:
each track assembly is independently rotatable with respect to a vertical axis of a respective one of the plurality of adjustable legs to steer the vehicle platform;
a first part of an actuator is coupled with an upper portion of the respective one of the plurality of legs; and
a second part of the actuator is coupled to a lower portion of the respective one of the plurality of legs.

22. The vehicle platform according to claim 21, wherein the actuator comprises an electric motor.

23. The vehicle platform according to claim 22, wherein the electric motor is positioned at or above two or more track assemblies.

24. The vehicle platform according to claim 21, wherein:
each track assembly is independently rotatable up to 180 degrees with respect to the vertical axis of the respective one of the plurality of adjustable legs to steer the vehicle platform.

25. The vehicle platform according to claim 1, wherein:
each track assembly is independently rotatable with respect to a vertical axis of a respective one of the plurality of adjustable legs to steer the vehicle platform;
a rotor of an actuator is coupled to a track assembly on the respective one of the plurality of legs; and
a stator of the actuator is coupled to the respective one of the plurality of legs above the track assembly.

26. The vehicle platform according to claim 1, wherein each track assembly comprises:
an outer belt or linked chains that forms a track or tread that can move or turn the vehicle with respect to the ground;
a drive wheel associated with a rotational energy source, such as an electric motor or hydraulic motor, the drive wheel engaging with an inner surface of the outer belt; and
wherein the control system is adapted to steer the vehicle platform utilizing a differential rotation of the outer belt or linked chains of one track assembly with respect to an outer belt or linked chains of another of the track assemblies.

27. The vehicle platform according to claim 26, wherein the control system is further adapted to adjust a track contact area in contact with the ground in response to observed vehicle ground speed with respect to a threshold speed or in response to an observed yaw rate change with respect to a threshold yaw rate change.

28. The vehicle platform according to claim 27, wherein the control system is adapted to reduce or minimize the track contact area in contact with the ground for a time period if a vehicle ground speed of the vehicle platform is greater or equal to a velocity threshold, if the yaw rate change is greater than or equal to the yaw rate change threshold, or if a current track contact area is not minimized.

* * * * *